(12) United States Patent
Bleicher et al.

(10) Patent No.: US 12,211,076 B2
(45) Date of Patent: Jan. 28, 2025

(54) SYSTEM, PLATFORM AND METHOD FOR PERSONALIZED SHOPPING USING A VIRTUAL SHOPPING ASSISTANT

(71) Applicant: NIKE, Inc., Beaverton, OR (US)

(72) Inventors: David Bleicher, Tel-Aviv (IL); Tamir Lousky, Bat-Yam (IL)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/256,472

(22) Filed: Jan. 24, 2019

(65) Prior Publication Data

US 2019/0228448 A1 Jul. 25, 2019

Related U.S. Application Data

(60) Provisional application No. 62/621,548, filed on Jan. 24, 2018.

(51) Int. Cl.
*G06Q 30/0601* (2023.01)
*G06T 19/00* (2011.01)

(52) U.S. Cl.
CPC ..... *G06Q 30/0621* (2013.01); *G06Q 30/0631* (2013.01); *G06Q 30/0643* (2013.01); *G06T 19/006* (2013.01)

(58) Field of Classification Search
CPC .............. G06T 19/006; G06Q 30/0643; G06Q 30/0621; G06Q 30/0631
(Continued)

(56) References Cited

U.S. PATENT DOCUMENTS

| 4,473,373 A | 9/1984 | Weiss |
| 5,164,793 A | 11/1992 | Wolfersberger et al. |

(Continued)

FOREIGN PATENT DOCUMENTS

| CN | 101707946 A | 5/2010 |
| CN | 101742048 A | 6/2010 |

(Continued)

OTHER PUBLICATIONS

Merriam-Webster Dictionary definitions of "augmented reality," "superimpose," & "real time," as referenced in Response to Arguments, retrieved from merriam-webster.com via Internet Archive, dated 2013-2014 (Year: 2014).*

(Continued)

*Primary Examiner* — Marissa Thein
*Assistant Examiner* — Thomas Joseph Sullivan
(74) *Attorney, Agent, or Firm* — Banner & Witcoff, Ltd.

(57) ABSTRACT

Apparatuses, systems, and methods to provider personalized online product fitting are disclosed. In a variety of embodiments, personalized shopping systems include an automated shopping assistant accessing product data, a matchmaking system accessing history data, preference data, and/or anatomical data measured using an automated shopping assistant apparatus, where the personalized shopping system can generate a personalized match based on the history data, preference data, and/or anatomical data. The automated shopping assistant apparatus may include depth sensors and/or image scanners which can capture a variety of 2D and/or 3D models. These models can be utilized to generate anatomical data. The anatomical data can be used to virtually try on a variety of items. Products may be personalized based on the history data, preference data, and/or anatomical data.

21 Claims, 31 Drawing Sheets

(58) Field of Classification Search
USPC .................................................. 705/26.5
See application file for complete search history.

(56) References Cited

U.S. PATENT DOCUMENTS

| | | |
|---|---|---|
| 5,689,446 A | 11/1997 | Sundman et al. |
| 6,289,107 B1 | 9/2001 | Borchers et al. |
| 6,546,356 B1 | 4/2003 | Genest |
| 8,065,200 B2 | 11/2011 | Schwartz |
| 8,567,081 B2 | 10/2013 | Smith |
| 8,655,053 B1 | 2/2014 | Hansen |
| 8,818,883 B2* | 8/2014 | Lawrence ............... G06F 3/011 705/26.1 |
| 8,868,157 B1 | 10/2014 | Soliz |
| 8,908,928 B1* | 12/2014 | Hansen ............... G06V 40/103 382/199 |
| 9,345,957 B2* | 5/2016 | Geisner ............... G06T 19/006 |
| 9,386,889 B2 | 7/2016 | Fischer |
| 9,449,343 B2* | 9/2016 | Mayerle ............. G06Q 30/0643 |
| 9,462,838 B1 | 10/2016 | Smith et al. |
| 9,477,980 B2* | 10/2016 | Zagel ............... G06K 9/00369 |
| 9,648,926 B2 | 5/2017 | Marks |
| 9,799,064 B2* | 10/2017 | Ohnemus ........... G06Q 30/0222 |
| 9,875,546 B1 | 1/2018 | Bhole et al. |
| 9,996,981 B1* | 6/2018 | Tran ..................... A43B 3/34 |
| 10,008,040 B2 | 6/2018 | Am et al. |
| 10,013,803 B2 | 7/2018 | Mach Shepherd et al. |
| 10,067,500 B2 | 9/2018 | Hargovan et al. |
| 10,380,794 B2 | 8/2019 | Hauswiesner et al. |
| 10,420,397 B2* | 9/2019 | Hei ..................... A61B 5/6898 |
| 10,573,004 B2 | 2/2020 | Husheer |
| 10,755,431 B2 | 8/2020 | Shea et al. |
| 11,324,285 B2* | 5/2022 | Hei ..................... G06T 7/62 |
| 11,514,673 B2* | 11/2022 | Lehrich ............... G06T 19/006 |
| 2002/0138170 A1* | 9/2002 | Onyshkevych ........ G06Q 30/06 700/130 |
| 2002/0140694 A1* | 10/2002 | Sauer ................. G06T 19/003 345/419 |
| 2003/0195623 A1 | 10/2003 | Marchitto et al. |
| 2004/0081336 A1 | 4/2004 | Brooks |
| 2006/0004592 A1 | 1/2006 | Faith |
| 2006/0104503 A1 | 5/2006 | Huang et al. |
| 2007/0005174 A1 | 1/2007 | Thomas |
| 2007/0056212 A1 | 3/2007 | Fink |
| 2008/0040278 A1 | 2/2008 | DeWitt |
| 2009/0051683 A1 | 2/2009 | Goonetilleke et al. |
| 2009/0247909 A1 | 10/2009 | Mukumoto |
| 2009/0287452 A1 | 11/2009 | Stanley et al. |
| 2010/0111370 A1* | 5/2010 | Black ............... G06K 9/00369 382/111 |
| 2010/0296726 A1 | 11/2010 | Rutschmann et al. |
| 2011/0047046 A1 | 2/2011 | Torres |
| 2011/0093344 A1* | 4/2011 | Burke ................. G06Q 30/06 705/14.65 |
| 2011/0298897 A1 | 12/2011 | Sareen et al. |
| 2012/0054041 A1 | 3/2012 | Williams |
| 2012/0085828 A1 | 4/2012 | Ziegler |
| 2012/0106796 A1 | 5/2012 | Jones et al. |
| 2012/0249741 A1 | 10/2012 | Maciocci et al. |
| 2012/0287122 A1 | 11/2012 | Nadar et al. |
| 2012/0303154 A1 | 11/2012 | Stiernagle |
| 2013/0080289 A1 | 3/2013 | Roy et al. |
| 2013/0095924 A1* | 4/2013 | Geisner .................. G06F 3/012 463/32 |
| 2013/0100256 A1 | 4/2013 | Kirk et al. |
| 2013/0110666 A1 | 5/2013 | Aubrey |
| 2013/0114869 A1 | 5/2013 | Hernandez Stark et al. |
| 2013/0215116 A1 | 8/2013 | Siddique et al. |
| 2013/0218721 A1 | 8/2013 | Borhan et al. |
| 2013/0246222 A1 | 9/2013 | Weerasinghe |
| 2013/0307851 A1* | 11/2013 | Hernandez ............. A43D 1/025 345/420 |
| 2014/0035913 A1* | 2/2014 | Higgins ............. G06Q 30/0641 345/420 |
| 2014/0040041 A1 | 2/2014 | Ohnemus et al. |
| 2014/0089134 A1 | 3/2014 | Linh et al. |
| 2014/0104395 A1 | 4/2014 | Rohaly et al. |
| 2014/0108208 A1 | 4/2014 | Piana |
| 2014/0156449 A1 | 6/2014 | Ganesan et al. |
| 2014/0176565 A1 | 6/2014 | Adeyoola et al. |
| 2014/0180864 A1 | 6/2014 | Orlov et al. |
| 2014/0244442 A1 | 8/2014 | Hirsch |
| 2014/0270540 A1 | 9/2014 | Spector et al. |
| 2014/0285646 A1* | 9/2014 | Kahlon ............... G06T 7/55 348/77 |
| 2014/0320529 A1* | 10/2014 | Roberts ............... G06T 19/006 345/633 |
| 2014/0337138 A1 | 11/2014 | Chitalia et al. |
| 2014/0358738 A1 | 12/2014 | Ohnemus et al. |
| 2015/0012380 A1 | 1/2015 | Bank et al. |
| 2015/0039422 A1 | 2/2015 | Abraham et al. |
| 2015/0066707 A1 | 3/2015 | Unger et al. |
| 2015/0066712 A1 | 3/2015 | Altieri |
| 2015/0070351 A1 | 3/2015 | Tarquini et al. |
| 2015/0127132 A1 | 5/2015 | Nyong'0 et al. |
| 2015/0127363 A1 | 5/2015 | Nyong'o et al. |
| 2015/0133754 A1 | 5/2015 | Freeman et al. |
| 2015/0154453 A1* | 6/2015 | Wilf .................. G06T 7/564 382/103 |
| 2015/0199816 A1* | 7/2015 | Freeman ............... G06T 7/74 382/103 |
| 2015/0223730 A1 | 8/2015 | Ferrantelli |
| 2015/0228084 A1 | 8/2015 | Belyaev et al. |
| 2015/0258431 A1 | 9/2015 | Stafford et al. |
| 2015/0328016 A1 | 11/2015 | Summit et al. |
| 2015/0339512 A1 | 11/2015 | Chetuparambil et al. |
| 2015/0342266 A1 | 12/2015 | Cooper et al. |
| 2015/0359461 A1 | 12/2015 | Alfaro et al. |
| 2016/0063613 A1 | 3/2016 | Zhao et al. |
| 2016/0071143 A1 | 3/2016 | Pokorney et al. |
| 2016/0081435 A1 | 3/2016 | Marks |
| 2016/0093085 A1 | 3/2016 | Ray et al. |
| 2016/0110479 A1 | 4/2016 | Li |
| 2016/0125499 A1 | 5/2016 | Gooch et al. |
| 2016/0180391 A1 | 6/2016 | Zabaneh |
| 2016/0183879 A1 | 6/2016 | Goldish et al. |
| 2016/0247017 A1 | 8/2016 | Sareen et al. |
| 2016/0286906 A1 | 10/2016 | Malal et al. |
| 2016/0350833 A1 | 12/2016 | Andon |
| 2016/0367191 A1 | 12/2016 | Esposito et al. |
| 2017/0004568 A1 | 1/2017 | Radner |
| 2017/0027477 A1 | 2/2017 | Charles et al. |
| 2017/0056212 A1 | 3/2017 | Jonsson et al. |
| 2017/0061683 A1 | 3/2017 | Dorin et al. |
| 2017/0076011 A1* | 3/2017 | Gannon ............. G06F 16/5866 |
| 2017/0083971 A1 | 3/2017 | Ray et al. |
| 2017/0169571 A1 | 6/2017 | Hung et al. |
| 2017/0208245 A1* | 7/2017 | Castillo ............... H04N 1/2104 |
| 2017/0272728 A1* | 9/2017 | Rafii ................. H04N 13/246 |
| 2017/0323299 A1 | 11/2017 | Davis |
| 2018/0033202 A1* | 2/2018 | Lam ................. G06K 9/00362 |
| 2018/0035762 A1 | 2/2018 | Towns et al. |
| 2018/0047200 A1* | 2/2018 | O'Hara ............... G06T 3/40 |
| 2018/0160776 A1 | 6/2018 | Hei et al. |
| 2018/0160777 A1 | 6/2018 | Hei et al. |
| 2018/0182091 A1 | 6/2018 | MacKinnon et al. |
| 2018/0218437 A1 | 8/2018 | Rusu et al. |
| 2018/0240238 A1 | 8/2018 | Husheer |
| 2018/0247426 A1 | 8/2018 | Gluck et al. |
| 2018/0300445 A1 | 10/2018 | Schouwenburg et al. |
| 2018/0300791 A1* | 10/2018 | Ganesan ........... G06Q 30/0601 |
| 2019/0026954 A1 | 1/2019 | Vats |
| 2019/0028637 A1* | 1/2019 | Kolesov ............. G06T 7/73 |
| 2019/0037134 A1 | 1/2019 | Merati |
| 2019/0082794 A1 | 3/2019 | Liu |
| 2019/0130788 A1* | 5/2019 | Seaton ................. G02B 27/017 |
| 2019/0139252 A1 | 5/2019 | Zaiss et al. |
| 2019/0188784 A1* | 6/2019 | Bleicher ............. G06F 16/00 |
| 2019/0385356 A1 | 12/2019 | Lodato et al. |
| 2020/0211170 A1 | 7/2020 | Coria Mendoza et al. |
| 2020/0311429 A1* | 10/2020 | Chen ................. A61B 5/1116 |
| 2021/0093050 A1 | 4/2021 | Lee et al. |

(56) References Cited

U.S. PATENT DOCUMENTS

| | | | |
|---|---|---|---|
| 2022/0183424 | A1 | 6/2022 | Nevala et al. |
| 2022/0202138 | A1* | 6/2022 | Hei .................. A61B 5/0022 |

FOREIGN PATENT DOCUMENTS

| | | |
|---|---|---|
| CN | 101819663 A | 9/2010 |
| CN | 201831042 U | 5/2011 |
| CN | 102200437 A | 9/2011 |
| CN | 102466472 A | 5/2012 |
| CN | 102682395 A | 9/2012 |
| CN | 103093543 A | 5/2013 |
| CN | 103597519 A | 2/2014 |
| CN | 103852130 A | 6/2014 |
| CN | 104040580 A | 9/2014 |
| CN | 104170519 A | 11/2014 |
| CN | 104699908 A | 6/2015 |
| CN | 104854623 A | 8/2015 |
| CN | 105662681 A | 6/2016 |
| CN | 106372374 A | 2/2017 |
| CN | 106942837 A | 7/2017 |
| JP | H06149376 A | 5/1994 |
| JP | 2000515088 A | 11/2000 |
| JP | 2001101272 A | 4/2001 |
| JP | 2002203167 A | 7/2002 |
| JP | 2003127994 A | 5/2003 |
| JP | 2003331108 A | 11/2003 |
| JP | 2005006905 A | 1/2005 |
| JP | 2005169015 A | 6/2005 |
| JP | 2007526028 A | 9/2007 |
| JP | 2007-267996 A | 10/2007 |
| JP | 2010510587 A | 4/2010 |
| JP | 2011-036869 A | 2/2011 |
| JP | 2013050937 A | 3/2013 |
| JP | 2013077314 A | 4/2013 |
| JP | 2013097799 A | 5/2013 |
| JP | 2014040231 A | 3/2014 |
| JP | 2016001360 A | 1/2016 |
| JP | 2016040649 A | 3/2016 |
| JP | 2016532197 A | 10/2016 |
| JP | 2017016356 A | 1/2017 |
| JP | 201779809 A | 5/2017 |
| JP | 2018526641 A | 9/2018 |
| JP | 2019049457 A | 3/2019 |
| JP | 2019056679 A | 4/2019 |
| KR | 200342176 Y1 | 2/2004 |
| KR | 20100019067 A | 2/2010 |
| KR | 20100131404 A | 12/2010 |
| KR | 20110131404 A | 12/2011 |
| KR | 20120123842 A | 11/2012 |
| KR | 20120123845 A | 11/2012 |
| KR | 20130052159 A | 5/2013 |
| KR | 20140123977 A | 10/2014 |
| KR | 20150061089 A | 6/2015 |
| KR | 20150070459 A | 6/2015 |
| KR | 20160005977 A | 1/2016 |
| KR | 20160021118 A | 2/2016 |
| TW | 201251444 A | 12/2012 |
| WO | 9748027 A1 | 12/1997 |
| WO | 2005006905 A1 | 1/2005 |
| WO | 2012072844 A1 | 6/2012 |
| WO | 2013026798 A1 | 2/2013 |
| WO | 2014159726 A1 | 10/2014 |
| WO | 2016051416 A1 | 4/2016 |
| WO | 2017127132 A1 | 7/2017 |
| WO | 2017220638 A1 | 12/2017 |
| WO | 2018048902 A1 | 3/2018 |
| WO | 2018109421 A1 | 6/2018 |

OTHER PUBLICATIONS

Schmeil, Andreas, et al., "MARA—A Mobile Augmented Reality-Based Virtual Assistant," Mar. 10, 2007, IEEE Virtual Reality Conference (Year: 2007).*

Brykman, Steven, "Get Ready! The Humanoid AR Assistants are Coming.," Oct. 18, 2017, medium.com: Interactive Mind (Year: 2017).*

Yang, Yu-I, et al., "A virtual try-on system in augmented reality using RGB-D cameras for footwear personalization," Oct. 2014, Journal of Manufacturing Systems vol. 33, Issue 4 (Year: 2014).*

Jul. 9, 2019—(WO) ISR & WO—App. No. PCT/US19/014958.

Oct. 1, 2018—(WO) ISR & WO—App. No. PCT/US18/039781.

Nov. 16, 2017—(WO) ISR & WO—App. No. PCT/US17/050281.

May 24, 2018—(WO) ISR & WO—App. No. PCT/IB18/050041.

Sep. 21, 2021—(WO) ISR & WO—App. No. PCT/US21/034932.

Anonymous: "How to Calculate Height of Android Phone from ground—Stack Overflow". Aug. 17, 2017 (Aug. 17, 2017), XP055836361, Retreived from the Internet: URL:https://stackoverflow.com/questions/17443936/how-to-calculate-height-of-android-phone-from-ground [retreived on Aug. 31, 2021].

Geometrix announces unique web 3D virtual try-on solution. (Oct. 23, 2000). PR Newswire Retrieved from https://dialog.proquest.com/professional/docview/444318359?accountid=161862 (Year: 2000).

A brief history of GPS, Mark Sullivan, 2012 (Year: 2012).

Dec. 4, 2017 (WO) International Search Report—PCT/US2017/43373, 12 pages.

"Accu Foot size", Accu foot size app review, Retrieved from the internet <URL https://www.apkmonk.com/app/com.accufootsize/>, 20157, 7 pages.

Mar. 29, 2018 (WO) International Search Report received for PCT Patent Application No. PCT/US2017/065878, 16 pages.

Nov. 19, 2018 (JP) Office Action received for Japanese Patent Application No. 2018-502047, 4 pages (Official Copy only)(See Communication under 37 CFR §v1.98(a)(3)).

Ganesan, Anand, "Footwear Virtual Fitting Service for E-Commerce & Physical Stores", findmeashoe.com, Jul. 2018, 27 pages.

Jun. 27, 2018 (WO) International Preliminary Report on Patentability received for PCT Patent Application No. PCT/US2017/065878, 13 pages.

Xu, et al. "A personalized assistant in 3D virtual shopping environment," 2010 Second International Conference on Intelligent Human-Machine Systems and Cybernetics, vol. 2, IEEE, 2010, 4 pages.

M. Yuan, et al., "A Mixed Reality Virtual Clothes Try-On System," in IEEE Transactions on Multimedia, vol. 15, No. 8, pp. 1958-1968, Dec. 2013, doi: 10.1109/TMM.2013.2280560 (Year: 2013).

Kabir, et al., Review Paper, "Mobile Apps for Foot Measurement: A Scoping Review," arXiv e-prints, Sep. 2020 (Year: 2020), 25 pages.

"GPA gait posture assessment", <<https://blog.naver.com/doveman/220777337061>>, Aug. 2, 2016, 14 pages.

Domina, Tanya, et al., "Thermal pattern variations analyzed using 2D/3D mapping techniques among females," Journal of Textile and Apparel, Technology and Management 7.1. (Year 2011).

Kimura, Takato, et al., "Automatic Crack Detection in Infrastructure Inspection Using Fully Convolutional Network," received Aug. 27, 2017, vol. 11, No. 1, 12-20 (Mar. 2018), 2018 Information Processing Society of Japan, 10 pages.

Ph. Guerlain, et al., "Digitizing and measuring of the human body for the clothing industry," International Journal of Clothing Science and Technology, vol. 18, No. 3, 2006, pp. 151-165, doi:http://dx.doi.org/10.1108/09556220610657925 (Year: 2006).

Zhaohui Zheng, Method and System for Shopping using a Computing Device, ip.com, Apr. 29, 2011, 3 pages.

* cited by examiner

Isometric View

Front View

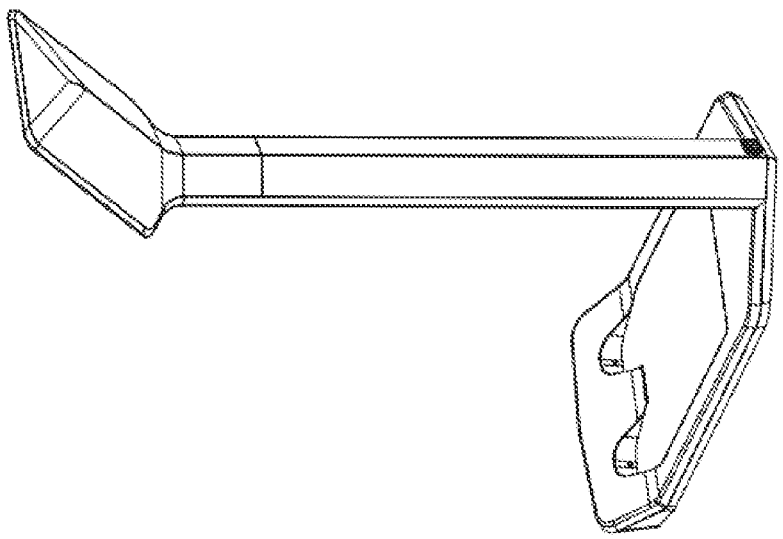
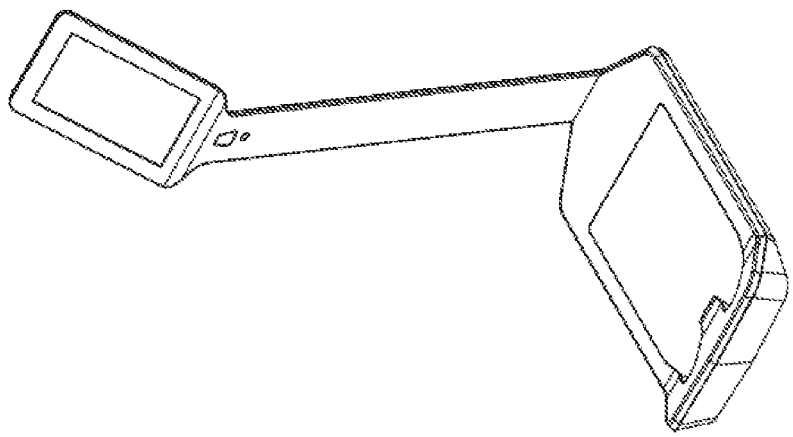
FIG. 8E
Isometric Back
FIG. 8D
Isometric Front

Top view

Side View

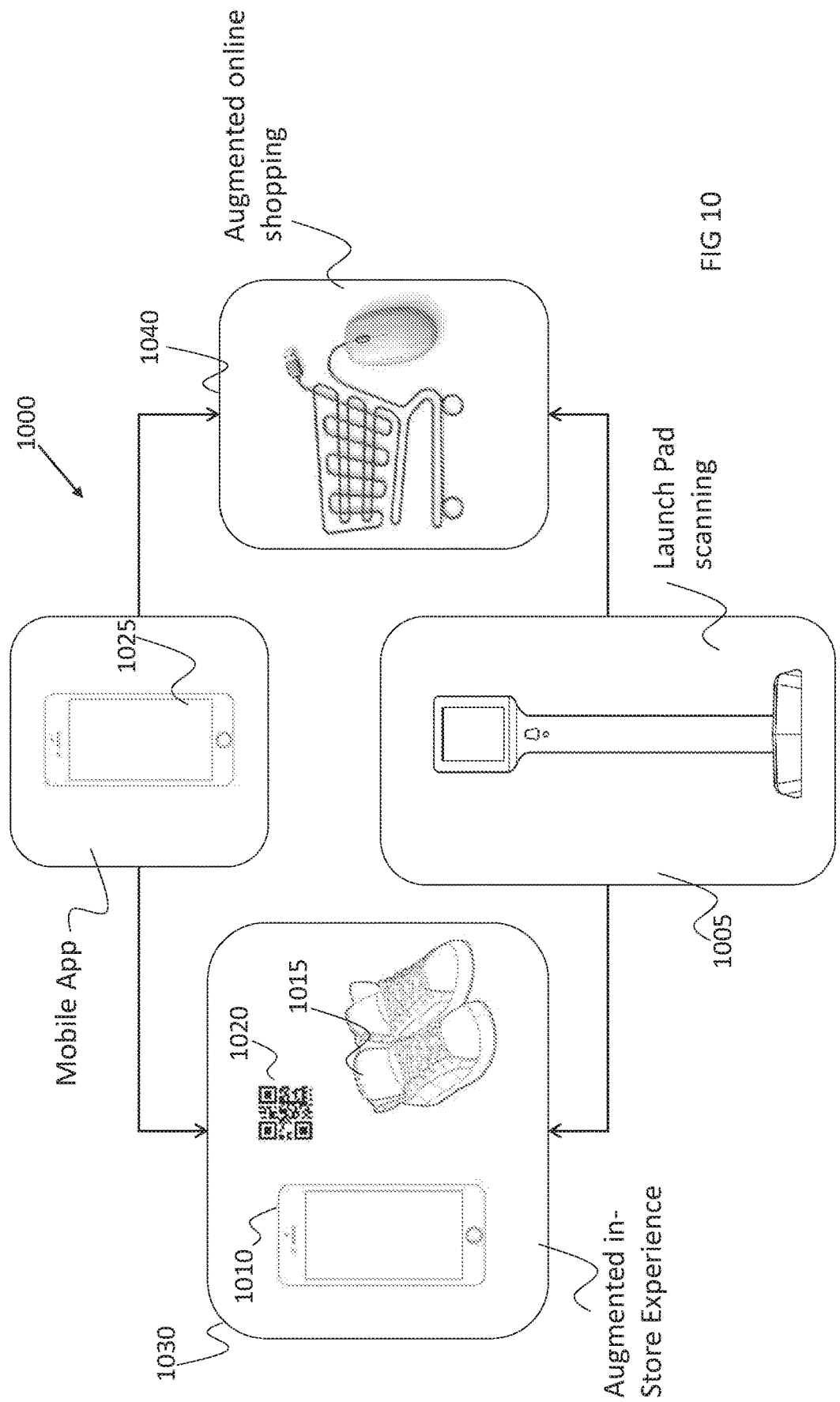

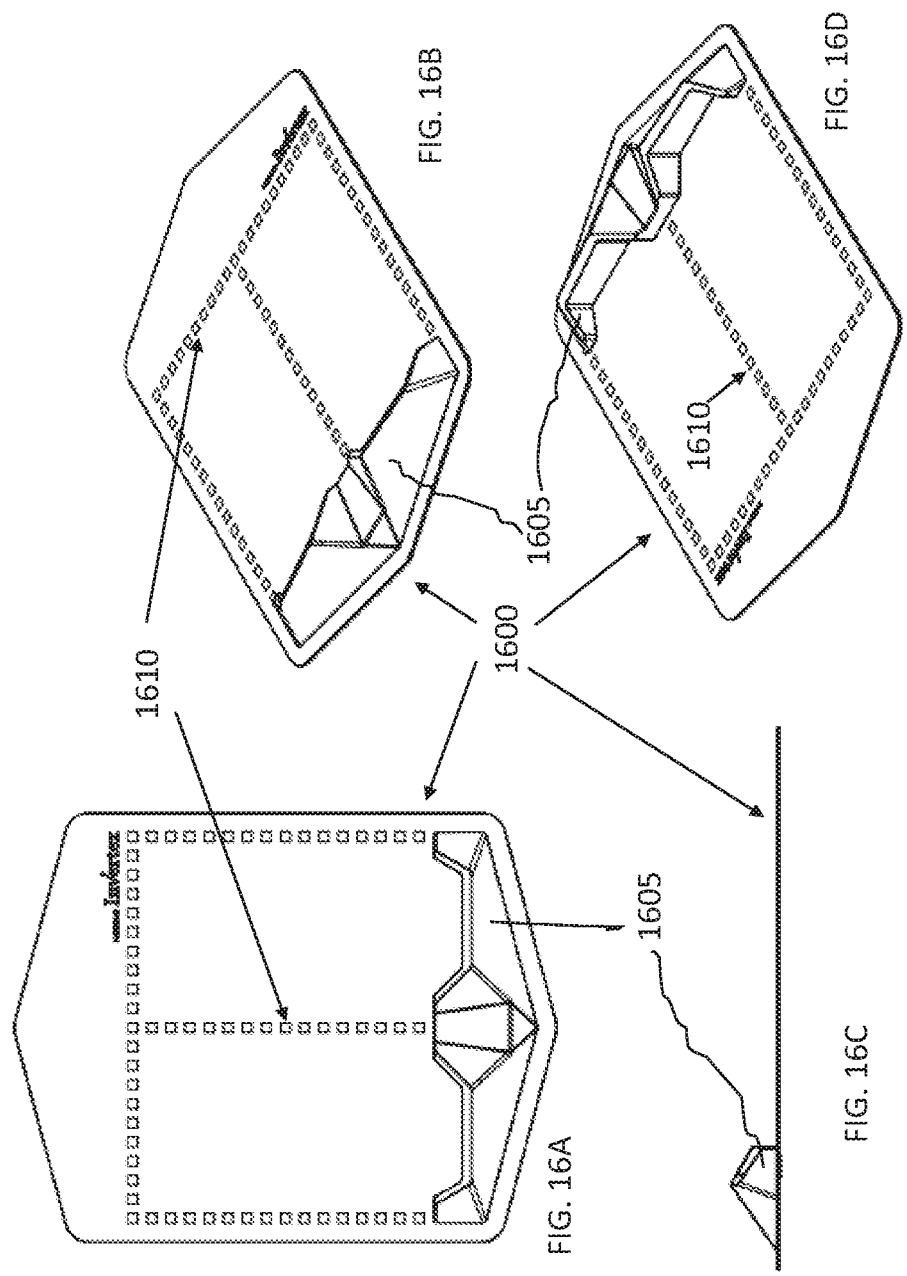

SYSTEM, PLATFORM AND METHOD FOR PERSONALIZED SHOPPING USING A VIRTUAL SHOPPING ASSISTANT

CROSS-REFERENCE TO RELATED APPLICATIONS

The instant application claims priority to U.S. Provisional Patent Application No. 62/621,548, titled "A System, Platform and Method for Personalized Shopping using a Virtual Shopping Assistant" and filed Jan. 24, 2018, the disclosure of which is hereby incorporated by reference in its entirety.

FIELD OF INVENTION

The present invention relates in general to methods, applications and devices useful in personalized product shopping.

BACKGROUND

A great majority of shoe shopping today still takes place in real bricks and mortar shops. Most customers are familiar with the limitations of conventional shopping, as are the shop managers and assistants. In general, customers are dependent on shopping assistants, to direct them towards products, location of in-stock products, assistance on trying on products etc.

Further, the typical shopping experience needs to repeated with substantially each visit of a customer to the same or a different shop, leading to great inefficiency and user frustration.

It would be highly advantageous to have a system or method that could enable highly accurate and user friendly automated or semi-automated fitting solutions, both online and in store.

SUMMARY

There is provided, in accordance with embodiments of the present invention, an apparatus, system, and method to provide personalized online product fitting.

A method for personalized shopping has the steps of an automated shopping assistant system accessing product data, a matchmaking system accessing user history data, the matchmaking system accessing user preference data, the matchmaking system accessing user anatomical data acquired from an automated shopping assistant apparatus, the automated shopping assistant system matching user history, preference and anatomical data with product data to generate a personalized matching system.

In some embodiments the automated shopping assistant system matches user history and preference data with product data, to generate personalized product recommendations.

In some embodiments the automated shopping assistant system may be used to enable the user to order personalized products.

In some embodiments the automated shopping assistant system may be used to providing a simulation that represents one or more anatomical characteristics of the user In many embodiments, the user and one or more third parties may provide product fitting feedback, and the user and one or more third parties may provide social feedback. The automated shopping assistant system may adjust the personalized product based on the product feedback. The system may also provide anatomical data about a user, wherein the automated shopping assistant system also considers the anatomical data to generate a user shopping avatar that contains one or more characteristics of the user.

The automated shopping assistant system may include a virtual try-on feature. In many embodiments, before the user orders the personalized product, the product is generated based on the avatar. The user preferences may be selected from the group consisting of size, color, material and type preferences.

According to some embodiments, a platform is provided for personalized shopping, including a cloud based server including a profile module for generating a digital avatar for multiple users, a product module for consolidating product data for multiple products, and a matchmaking module adapted to run code to match the digital avatar data and the product data, to generate product recommendations; an end user computing device, communicatively connected to the cloud based server, including an image capture element, wherein the matchmaking module runs a software application to generate a user mobile shopping avatar based on the capture of at least a part of the user anatomy, to be used in generating anatomical data for the digital avatar profile for a user.

In some embodiments, the platform is adapted to generate and/or present a simulation that represents one or more anatomical characteristics of the user In some embodiments, the platform may have a product ordering module, a product customization module, a social shopping module, and/or a product fitting module etc.

A handheld system for personalized shopping may have a screen configured to receive a user's input, a device camera to capture standard images of a user anatomy, and a processor having registers adapted to analyze anatomical data, product data, user history data and user preference data, wherein the processor retrieves information from the registers, and writes information to the registers, is configured to match user history and preference data with product data to generate a personalized matching system, and the processor is configured to match user history and preference data with product data, to generate a personalized product, and wherein the user may purchase the personalized product by providing user input to the screen.

In several embodiments, the system has a depth sensor configured to accurately determine the distance of a subject from the sensor, and wherein depth sensor information is used to match preference data with product data. In some embodiments, the depth sensor is capable to provide a 3D scan of at least a part of a body that relates to an anatomical profile of a user, to enable capture of length, breadth and depth of the part of the body.

In some embodiments, the handheld system includes a software application running on the handheld system, to generate and present a graphic simulation of a user mobile shopping profile based on the capture of at least a part of the user anatomy.

A shopping assistant system for shopping using a shopping profile is provided, comprising a shopping assistant virtual standing surface, for generating a 3D user shopping profile based on a capture of at least a part of a user's body by a camera device; a mobile device app for applying the user shopping profile in a store; a shopping assistant server connected to a shopping assistant database, based in a communications cloud; and multiple products tags for enabling the user to capture selected products.

The shopping assistant system, further comprising one or more image scanners for capturing at least a part of a body that relates to an anatomical profile of a user, to enable capture of length, breadth and depth of the part of the body.

The shopping assistant system, wherein the shopping assistant standing surface includes one or more Augmented Reality (AR) generated markings for assisting the capturing of body part dimensions.

The shopping assistant system, wherein the shopping assistant virtual standing surface includes one or more Augmented Reality (AR) generated 3D elements for assisting the positioning of a body part to be scanned.

The shopping assistant system, further comprising multiple product tags associated with multiple products, for a user to shop by scanning one or more product tags.

The shopping assistant system, further comprising a shopping profile for each of a plurality of users, for enabling a mobile device user to shop for another user using the other user's shopping profile.

A method for in-store shopping enhancement is provided, comprising identifying a user entering a shopping area, positioning the user on the shopping assistant virtual standing surface; opening a new or known user profile; initiating capture of at least a part of a body using one or more sensors; generating a user 3D shopping profile of the user; sending the user shopping profile to the user mobile device, where it is usable in a shopping assistant application; selecting a product of interest by the user, by scanning a product tab using the user mobile device; and providing the user with shopping assistance for the selected product.

The method, further comprising ordering a selected product using the user mobile device.

The method, further comprising customizing a selected product using the user mobile device.

The method, further comprising ordering a customized product using the user mobile device.

The method, further comprising providing the user product inventory information.

The method, further comprising fitting the selected product on the user shopping profile avatar.

The method, further comprising sending the fitted user profile avatar to a social media system for viewing by selected associated connected to the user.

The method, further comprising enhancing the user shopping profile based on the user behavior.

The method, further comprising providing shopping recommendations based on the user shopping profile and/or user shopping behavior.

The method, further comprising using the user shopping profile for shopping in an online store.

The method, further comprising adding additional user shopping profiles to a mobile device.

The method, further comprising converting a user's profile from an in-store apparatus to a user mobile device.

In many embodiments, a method is provided for user shopping profile generation using a virtual standing surface, including running a virtual shopping assistant application to instruct a user to prepare the environment for a profile generating scan; to subsequently place the reference object in an appropriate location; then to capture the environment with their device camera, including capture of the reference object, and to tap on the reference object captured to define it as the reference object; provide a virtual assistant to further assist or guide the user to execute the scan appropriately, using an AR rendition of the user figuring on the virtual scanning surface or map; subsequently to instruct the user to stand in the digitally super-imposed virtual scan mat; then start the scan; process the scan to form a user profile; and then to enable the user to shop in a real or digital store, using the shopping profile.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein:

FIGS. 8B-8H show a set of views of an example of a shopping assistant apparatus, according to some embodiments;

FIG. 10 is a flow diagram indicating an example of integrated usage of a shopping assistant in store apparatus, and a remote user communications device with a personalized shopping support application, according to some embodiments;

FIGS. 16A-16D show a set of views of an example of a shopping assistant standing surface, according to some embodiments;

DETAILED DESCRIPTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The term "fitting" as used herein can refer to trying on a product, seeing a product tried on, modifying the product to a particular person's body or other physical parameters. The term "avatar" can refer to a personification, icon, model and/or figure representing a particular person, in particular, to represent a person on screen.

The relatively low rate of footwear purchases online shopping may be increased by providing an accurate size recommendation to the customer, optionally based on a simulation or avatar model of a customer's feet, for each shoe model, leading to higher customer confidence in the purchase.

Non-limiting embodiments of the present invention include a system, platform, and method for facilitating highly personalized shopping, whether online and/or in-store, including effective fitting-on of products. In some embodiments, systems, platforms and methods are provided for enabling personalized manufacturing of product.

Figure 1A:
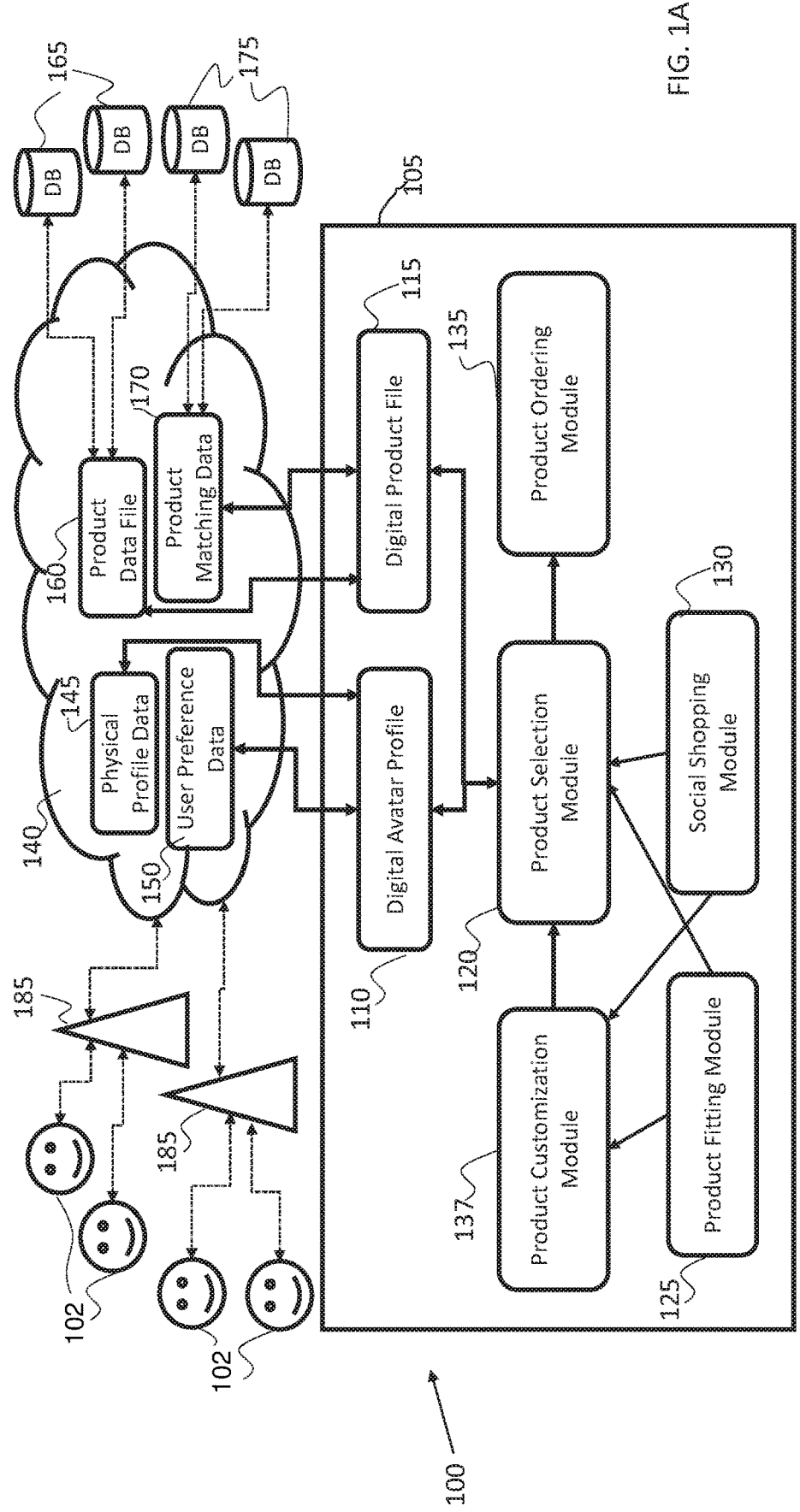
FIG. 1A is a schematic system diagram depicting a system for facilitating personalized shopping, according to some embodiments.

Reference is now made to FIG. 1A, which is a schematic system diagram depicting a system 100 for facilitating personalized shopping, according to some embodiments. System 100 enables seamless shopping in store and/or online, using a highly accurate user shopping profile and/or avatar, generated by an automated shopping assistant apparatus. In some cases, data processing is performed on the cloud and/or on the local automated shopping assistant apparatus.

As can be seen, personalized shopping system 100 includes a platform 105 for personalized shopping profile management, which may include a digital avatar profile module 110, a digital product file module 115, a product selection module 120, a product fitting module 125, a social shopping module 130, a product ordering module 135 and a product customization module 137.

Platform 105 is in communication with communications cloud 140, which may include physical profile data module 145, communicatively connected to launch pad, kiosk, or automated shopping assistant apparatus 185, which is further connected communicatively to users 102, providing physical user data, for example, from 2D and/or 3D scans or other digital measurement sources. Communications cloud 140 may further include user preference data module 150, communicatively connected to automated shopping assistant apparatus 185, and/or to 102, providing user preference data. Communications cloud 140 may further include product file data module 160, communicatively connected to product databases 165, and product matching data module 170 containing product matching algorithms, communicatively connected to product databases 175.

In several embodiments, apparatus 185 includes one or more imaging devices, such as 2D and/or 3D cameras, that may be moving or static components. Apparatus 185 may further include one or more sensors, for example, a proximity sensor, scanner, camera, pressure plate and/or other sensors.

As can be seen, digital avatar profile 110 is highly personalized, constructed from various data sources, whether directly or indirectly from a user, and whether representing physical characteristics and/or mental, emotional, psychological characteristics. Digital avatar profile 120 generally includes a file or group of files and data points from which instructions can be executed to enable the generation of a high resolution user profile or avatar from one or more data sources. Further, product selection module 120 generally matches up personalized avatar profile 110 with selected digital products, whether online or offline. The calculations for the matching algorithm may be performed by a processor through storage, retrieval and processing of data. In some embodiments one or more device registers may be used, wherein the register(s) refers to one of a small set of data holding places that are part of a computer processor, for holding a computer instruction, a storage address, or any kind of data. The matching algorithm, in some embodiments, may include running code to provide perfect or close to perfect matches between product types, sizes, styles etc. provided by a product database, and the physical parameters and/or user preference data as defined by the user Avatar profile, based at least on a scan of at least a part of the user's body that relates to the user's profile. For example, user A has a foot profile that is defined by a size, width, and depth. Further the user's profile may include preference data such as preferred styles, shoe types and colors, such as a blue or grey athletic shoe. The Product database may include, for example, an athletic shoe is colors blue, grey and blue-grey, in the precise or close enough to the user's size, width and depth. In this case, the matching algorithm will match the profile definitions with the one or more products from the product database that match the user profile.

Product selection module 120 may be further refined by providing system feedback and product fitting data using product fitting module 125, as well as social shopping data from social shopping module 130. Product fitting module, in some embodiments, includes a means for feedback from a shopping assistant or supporter that is with the shopper. In many embodiments, product fitting module includes a means for feedback from a virtual shopping assistant or supporter, for example, a communicatively connected supporter, a digital or virtual mirror or screen showing the user with the product. Further, product customization module 137 may receive data from product fitting module 125 and/or social shopping module 130, to help further personalize the product being considered for acquisition in accordance with the digital avatar and the product fitting module 125 and/or social shopping module 130. Product customization module 137 may enable a user to change or customize the product being tried on or tested, for example, by changing product colors, shape, design, size, materials etc. In this way, the product to be ordered may be constructed in accordance with user specific or customized requirements. Further, the Product customization module 137 may send to the product selection module 120 the customized product as chosen or generated by the user, after which the product selection module 120 may initiate the ordering of the customized product, via the product ordering module 135. Moreover, user updates embodied in the user's changes made in product selection module 120 may be used to update the digital avatar profile 110, thereby keeping the user avatar profile updated, for example, to user body changes, preference changes, etc.

Product selection module 120 includes a file or group of files and data points from which instructions can be executed to execute commands to enable the matching of high resolution user profiles or avatars to products that have a high level of fit to the shopping research being performed by each system user. This module may further integrate the feedback generated in the system modules to constantly improve the accurate product recommendation it provides. Using a variety of technical procedures that are performed on the avatar, such as integrating volume, cross section area and circumferences as well as length, width, height and additional distances, the system may represent the avatar in an array of representing numbers. This array of numbers, in some embodiments, may represent the various elements of the avatar, to allow for comparison to similar elements of the products to be tried on by the avatar. Accordingly, when the avatar data, which may be enhanced using recommendation algorithms and machine learning techniques etc., is compared to the product data from the product file, this may allow for an accurate, constantly improving, personalized product recommendation from the system.

According to some embodiment, digital avatar profile can be generated with relatively Low level integration of 3D scanners. In some examples sensors or scanners that may be used may include structured light, time-of-light, photogrammetry, or any other type of 3D and/or 2D scanning technology. Suppliers of such technology, include, but not limited to, are PrimeSense™ based scanners, Occipital Structure Sensors, 3D-Systems Sense and iSense™ sensors, Intel™ RealSense sensors (stand alone or machine integrated), Scanning Platforms based on iPad s or tablets, PC (Integrated and External), Android+RealSense (Next generation) devices, and Google project Tango devices etc.

Figure 1B:
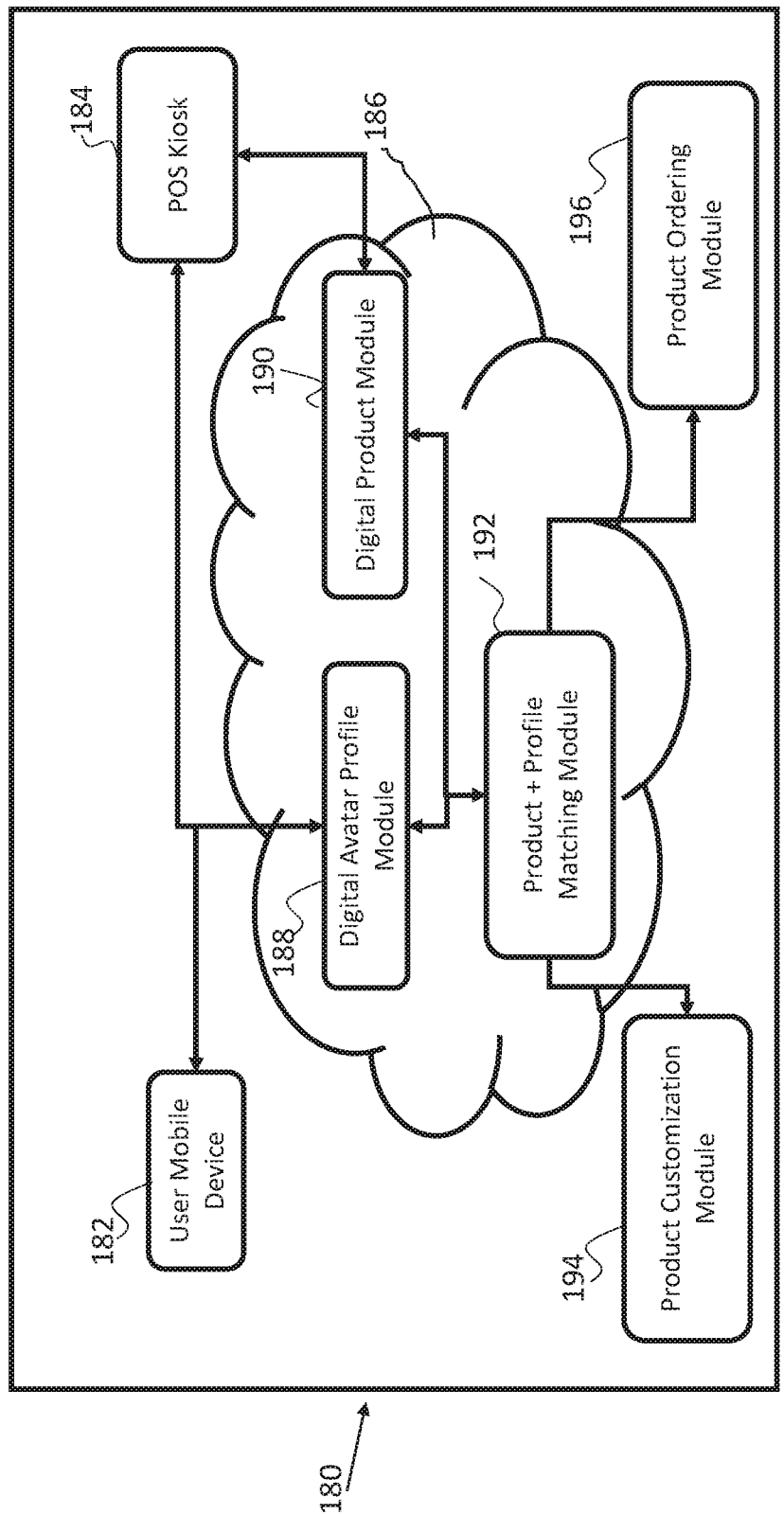
FIG. 1B is a schematic system diagram depicting a platform for facilitating personalized shopping, according to some embodiments.

Reference is now made to FIG. 1B, which is a schematic system diagram depicting a platform 180 for facilitating personalized shopping, according to some embodiments. As can be seen, personalized shopping platform 180 includes one or more user mobile devices 182, such as smartphones or tablets, including, without limitation, a camera, application and data connectivity; a shop or point of sale computing device, kiosk or automated shopping assistant apparatus 184, typically at or near a shop, for example an electronic device with a one or more cameras, sensors or scanning devices, Application, and data connectivity; where mobile device(s) 182 and or automated shopping assistant apparatus 185 connect to the communications cloud 186. Communications cloud 186 includes a digital product module 190, for holding, consolidating and otherwise managing data for multiple products; a digital Avatar profile module 188, for holding, consolidating, processing and otherwise managing profile data for multiple users; and matching module 192, for matching product and avatar profile data, to assist in enabling product recommendations and other matching functions. Platform 180 further includes a product customization module 194, for enabling ordering of customized products based on matching module output and or user choices; and Product ordering module 196, for enabling ordering of products based on the based on matching module output and or user choices.

Figure 2:
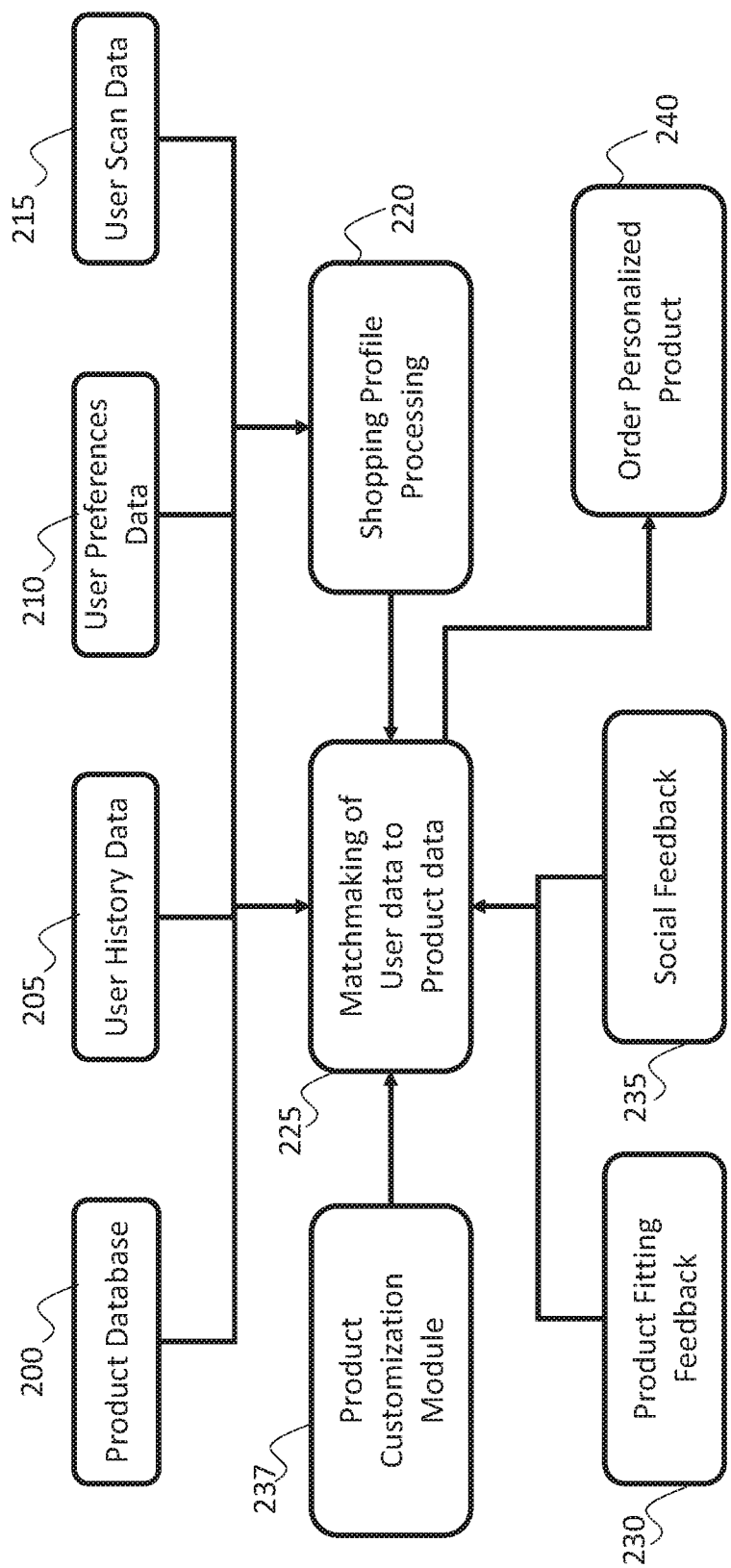
FIG. 2 is a flow diagram indicating a process of facilitating personalized shopping, according to some embodiments.

Reference is now made to FIG. 2, which is a is a flow diagram indicating a process of facilitating personalized shopping, whether online or offline, according to some embodiments. As can be seen, product information from a product database 200 may be used for products to be discovered, purchased or manufactured. At step 205 history data for a user may be retrieved, for example, based upon previous user purchases and research. At step 210 user preference data may be acquired, such as size, color, material, type preferences etc. At step 215, scanned or graphic data may be acquired for a user, for example, from standard photographs, 2D and/or 3D image scanning, or from capture and processing using a POS Kiosk or automated shopping assistant apparatus etc. This graphic data is used by the personalized shopping system to generate a user's physical profile based on the user's physical properties. At step 220 a multi-dimensional user shopping profile, hereinafter referred to as a user shopping avatar, may be developed, by processing the various input data from steps 205, 210 and 215, thereby generating a user shopping avatar or profile that includes user physical properties as well as user behavior and user preference data. The profile or avatar is a dynamic structure which may constantly improve in the way it animates, reflects or represents the user, optionally using feedback and additional inputs from steps 205, 210, and/or 215. In one implementation, a user avatar may be used to match a user to potential products, in a single store, and/or in multiple stores, for example, in any retail store in a chain of stores, or online, in a network or affiliation of online and/or offline stores or platforms.

At step 225, a matchmaking of the user shopping profile to products being researched or required is executed. At this step, the product data from product database 200 is matched to products being researched by a user, in accordance to the specific user shopping profile, thereby enabling advanced filtering out of non-appropriate products for the specific user, and the advanced matching up of appropriate products, in accordance with the specific user's personal shopping profile and preferences. The step of matching may be complemented by a provision of recommendations for the user, based on the above user profile to product matchmaking process.

At step 230 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. In some cases, advanced graphic processing and 3D rendering may be used for the user to virtually try on the product being researched, such that the users may see themselves dressed in the product in accordance with a digital simulation that places the product onto the user shopping avatar. In some cases, the system may provide a static or dynamic high resolution visual output such as an animated avatar or character, rendered pictures and/or visual representation of the recommendation, optionally fitted on the avatar. For example, such a rendition may allow the user to see the product being tried on to be depicted on the avatar, thereby helping the user to visualize details such as fit, tightness, color, style, material etc., according to color heat maps etc. For example, color heat maps may be used to indicate areas of tightness, tension, friction etc. when the product interfaces with the body. As above, the user may use the shopping Avatar to provider further feedback to modify the user's shopping profile. At step 235 feedback may be acquired from social networks or direct third party feedback to which a user is connected, to help modify the user shopping profile.

At step 237, product customization may integrate data from product fitting feedback at step 230 and/or social feedback at step 235, to help further personalize the product being considered for acquisition in accordance with the digital avatar and the product fitting module 125 and/or social shopping module 130.

At step 240, a personalized product may be ordered by a user, whether inside a physical store or an online store. Further, a personalized product may be ordered from a manufacturer who may produce a product based upon the user's request such that the product is a once-off customized product for a user. The custom products may include, for example, various types of customization including material type, print samples, color, size, volume, angles, model variation, styles. Personal tailoring etc.

Figure 3:
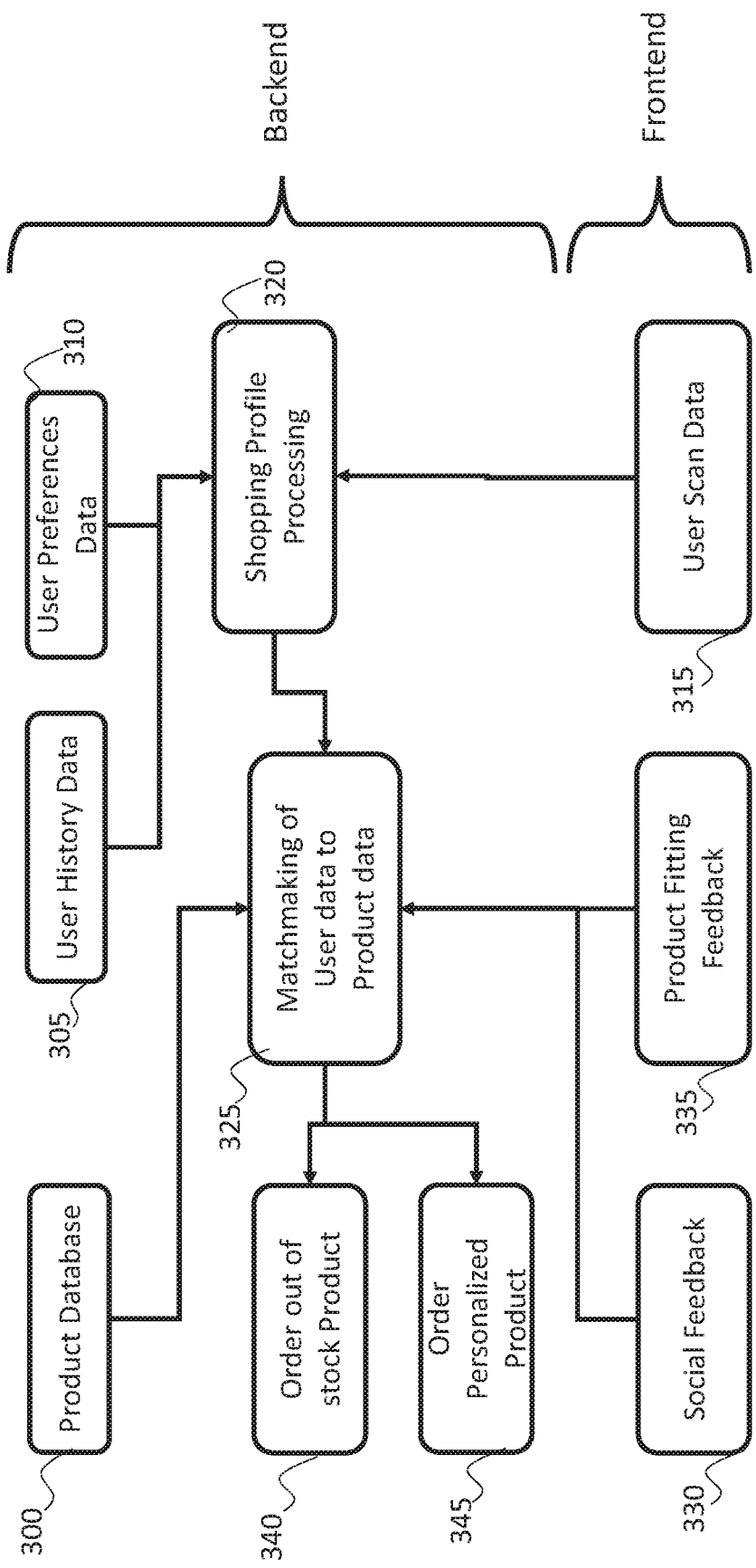
FIG. 3 is a flow diagram for facilitating a personalized in-store shopping experience, according to some embodiments.

Reference is now made to FIG. 3, which is a flow diagram for facilitating a personalized offline (in the store) shopping experience, according to some embodiments. As can be seen, at the backend or computing system supporting a physical store, product information from a product database 300 may be used for products to be discovered, purchased or manufactured by an online user. In some embodiments product database is associated with a product data processing module, which is adapted to perform high intensity calculations on the local point-of-sale device and/or on the cloud, depending on the type and requirements. At step 305 history data for a user may be retrieved, for example, based upon previous user purchases in a store or chain of stores. At step 310 user preference data may be acquired, such as size, color, material, type preferences etc. At step 315, at the frontend or user side, scanned or graphic data may be acquired for a user, for example, from standard photographs, 2D and/or 3D image scanning, or from capture and processing using a POS Kiosk or apparatus etc. In some embodiments a dedicated or generic application on a smart phone, tablet or other computing device may be used to enable effective photographing or scanning of a user. In several embodiments a dedicated or generic camera or scanning device, kiosk or standing station (moving or static) may be used by a shopping assistant, helper, sales person and/or associate. At step 320, this geometrical data is used by the personalized shopping system, together with the various input data from steps 305 and 310, to generate a multidimensional user shopping avatar or profile that includes user physical properties as well as user behavior and user preference data.

At step 325, a matchmaking of the user shopping profile to products being researched or required is executed. At this step, the product data from product database 300 is matched to products being requested by a user, in accordance to the specific user shopping profile. The step of matching may be complemented by a provision of recommendations for the user, based on the above user profile to product matchmaking process, thereby enabling advanced filtering out of non-appropriate products for the specific user, and the advanced matching up of appropriate products, in accordance with the specific user's personal shopping profile and preferences. This advanced filtering enables a shop salesperson, for example, or the user themselves, to be presented with substantially appropriate products, optionally products that are currently available, rather than have the user select items that are non-appropriate, thereby wasting time and resources of shopping assistants and the shopper themselves. This also allows for users to benefit from matching and recommendation data, which was generated for other avatars or users, which may share similar features, optionally in an anonymized manner, thus enabling a smarter and more accurate matching and/or recommendations.

At step 330 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. At step 335 feedback may be acquired from the users, using an active and/or passive approach. For example, active entry of feedback may occur when the system receives actual feedback about the fit (e.g., good/bad/off by how much) or other aspects, whether from a present person or people and/or a remote person or people. Such feedback may allow a user to, for example, enter selected choices into the system, for example, via a box or text entry element where the user may enter a selected size, type or other preference. Passive feedback may occur when the system receives actual feedback about the fit or other aspects, originating from sales information, returns, etc., or by trying on certain types, colors, sizes etc., enables the system to learn from the user's past choices and behavior, to further improve the personal avatar as well as the product information and fit for other users. In some cases, advanced graphic processing and 3D rendering may be used for the user to try on the product being researched, such that the user may see themselves virtually dressed in the product in accordance with a digital simulation that places the product onto the user shopping avatar. As above, the user may use the shopping Avatar to provider further feedback to modify the user's shopping profile.

At step 340, a personalized product may be ordered by a user from a physical store, for example, for a product that is in principle available but not currently in the store, or to enable manufacturing of a specifically required product based upon the user's shopping avatar, such that the product is a once-off customized product for a user.

At step 345 the user can select a personalized product and/or modify or design a product, optionally based on a product which s/he has seen, liked and chosen in the store, to purchase a custom product which will be created and/or manufactured for her/him. These modifications may include visual changes, such as name engraving, colors, materials, prints etc., as well as physical properties, such as controlling the height of the heels in shoes, the thickness of a frame in eyewear etc. At steps 340 and 345, these features may allow the in-store customers to enjoy features that are typically limited to e-commerce and online shopping.

Figure 4:
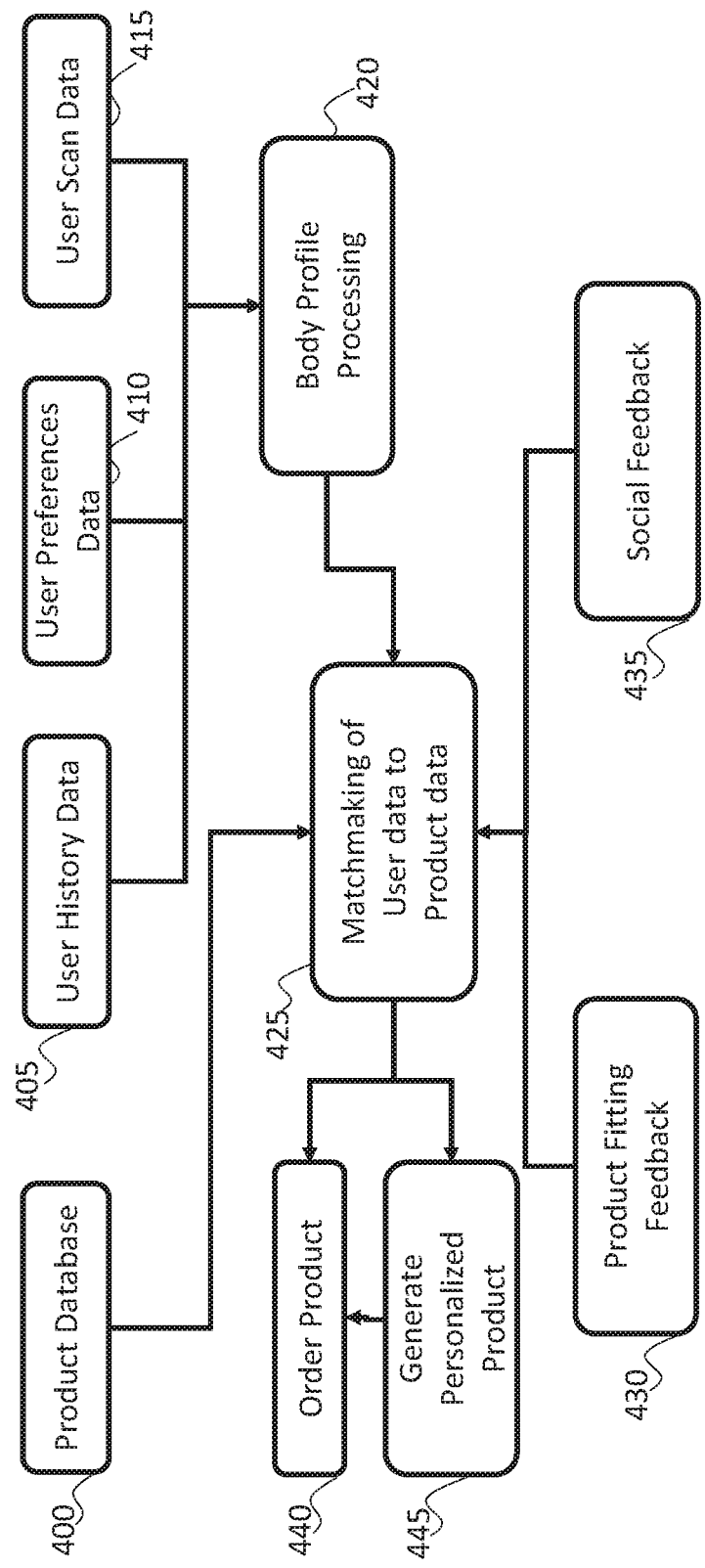
FIG. 4 is a flow diagram for facilitating a personalized online shopping experience, according to some embodiments.

Reference is now made to FIG. 4, which is a flow diagram for facilitating a personalized online shopping experience, according to some embodiments. As can be seen, an online store may acquire product information from a product database 400, for a selection of products to be offered to online users. At step 405 history data for an online user may be retrieved, for example, based upon previous user purchases and research. At step 410 user preference data may be acquired, such as size, color, material, type preferences etc. At step 415, scanned or graphic data may be acquired for a user, for example, from standard photographs, 2D and/or 3D image scanning, or from capture and processing using a POS Kiosk or apparatus etc. In some embodiments a dedicated or generic application on a smart phone, tablet or other computing device may be used to enable effective photographing or scanning of a user. In many embodiments a webcam, 3D camera, video recorder etc. may be used to acquire scanned or graphic data. At step 420, this graphic data is used by the personalized shopping system, together with the various input data from steps 405, 410 and 415, to generate a multidimensional user shopping avatar or profile that includes user physical properties as well as user behavior and user preference data.

At step 425, a matchmaking of the user shopping profile to products being researched or required is executed. At this step, the product data from product database 400 is matched to products being researched by a user, in accordance to the specific user shopping profile, thereby enabling advanced recommending of product matches, for example, to aid filtering out of non-appropriate products for the specific user, and the advanced matching up of appropriate products, in accordance with the specific user's personal shopping profile and preferences.

At step 430 product fitting data from feedback of remote people, such as family members, friends or shopping assistants connected via a smart phone or computer for example, may be used to help modify the matchmaking of user data to product data, for example, to include data relating to which colors look good on a person or which size looks best etc. may be used by the user to update their shopping profile. In further examples, code may be used to provide product color recommendations, size or fit recommendations etc. This feedback may be collected actively from the user or statically, for example based on the purchase information, shipping and return shipping data etc. At step 435 feedback may be acquired from social networks or to which a user is connected, to help modify the user shopping profile. In addition, a human and/or machine based digital representative, style expert and/or additional guiding information may be inputted to improve the guidance and support provided to the shopper in the online purchase process. In some cases, advanced graphic processing and 3D rendering may be used to enable the user to virtually try on the product being researched, such that the user may see themselves dressed in the product in accordance with a digital simulation that places the product onto the user shopping avatar. This may be done using real-time simulation, allowing for a live stream of animated video or high resolution images of the simulation etc. The "digital try-on", in some embodiments, may include a physics simulation to include the exact positioning of the element on the avatar in movement on in a static position. As above, the user may use the shopping Avatar to provider further feedback to modify the user's shopping profile.

At step 440, a product may be ordered by a user from an online store. Optionally, at step 445, a personalized product may be generated by a user from an online store, to enable manufacturing of a specifically required product based upon the user's shopping avatar, such that the product is a one-off customized product for a user. The shopping system, in case of a custom manufacturing output, may if needed, connect directly to the company production hardware and ERP system to facilitate such personalized product manufacturing. in one example, the personalized product may be represented in 3D printer files such as STL models or digital cutting devices, such as DXF or DWG files. In many embodiments, this could be a custom routing card or production instruction and BOM files. Additional input may include be visual renders that will help a product manufacturer or printer to visually design the custom product.

In some embodiments, the data from product database 400 may be used, together with the body or avatar profile derived in step 420, to develop a customized product at step 445, optionally without product matchmaking at step 425.

Figure 5:
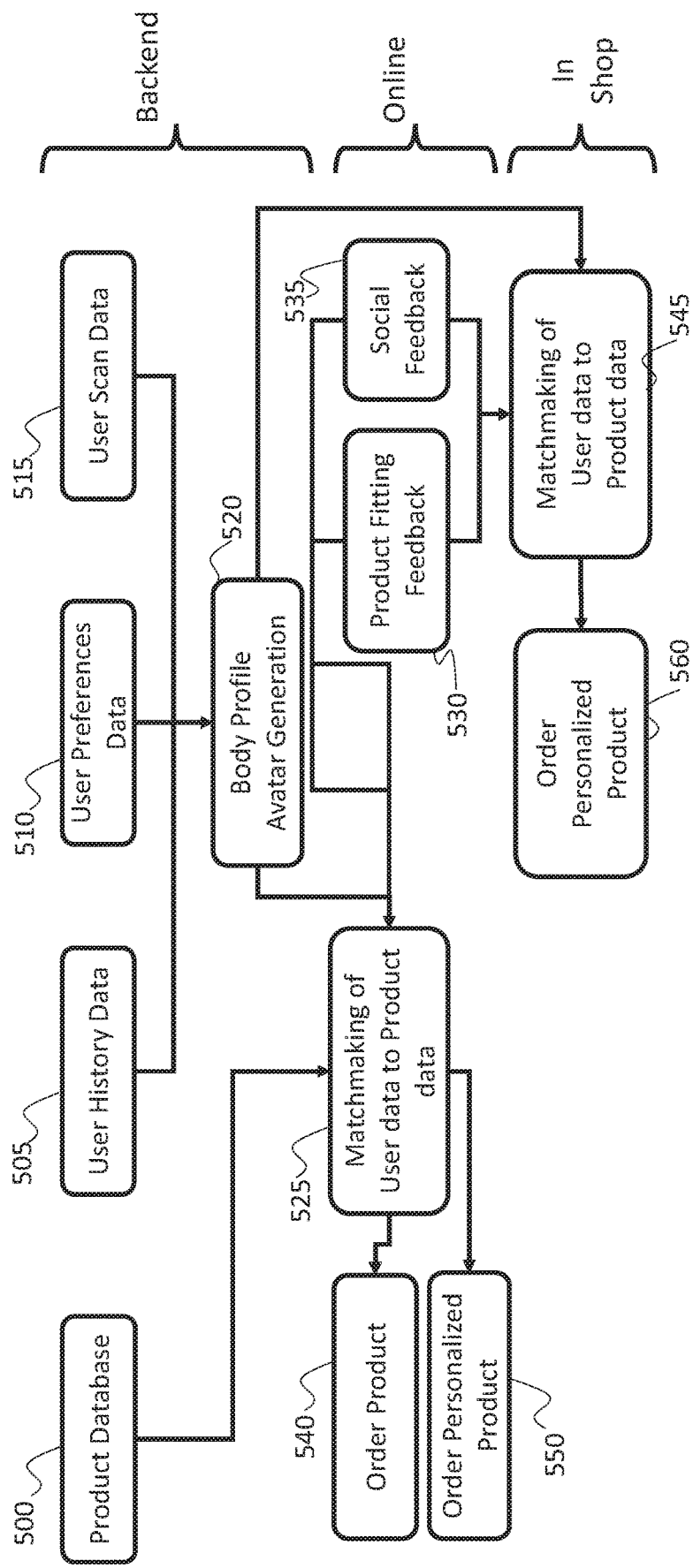
FIG. 5 is a flow diagram indicating an example of personalized hybrid shopping experience, according to some embodiments.

Reference is now made to FIG. 5, which is a flow diagram indicating an example of personalized hybrid shopping experience, according to some embodiments. As can be seen in the figure, at the backend or computing system supporting a physical and/or online store, product information from a product database 500 may be used for products to be discovered, purchased or manufactured by an online or in store user. At step 505 history data for a user may be retrieved, for example, based upon previous user purchases in a store or chain of stores, whether from online and/or in store experiences. At step 510 user preference data may be acquired, such as size, color, material, type preferences etc. At step 515, at the frontend or user side, whether executed by the user or by a shopping assistant, scanned or graphic data may be acquired for a user, for example, from standard photographs, 2D and/or 3D scanning, or from capture and processing using a POS Kiosk etc. In some embodiments a dedicated or generic application on a smart phone, tablet or other computing device may be used to enable effective photographing or scanning of a user. In many embodiments a dedicated or generic camera or scanning device may be used by a shopping assistant, which may include portable or non-portable devices, kiosk type or stand-alone devices. At step 520, this graphic data is used by the personalized shopping system, together with the various input data from steps 505, 510 and 515, to generate a multidimensional user shopping avatar or profile that includes user physical properties as well as user behavior and user preference data. One advantage of this system is the seamless transfer in which the users can transition between online and offline shopping, while enjoying the benefits of personalization, using a constantly updated personal profile in the online and/or in-store scenarios.

In some embodiments, at step 525, a matchmaking of the user shopping profile to products being researched or required is executed, for an online shopping optionally located in a physical store. At this step, the product data from product database 500 is matched to products being requested by a user, in accordance to the specific user shopping profile, thereby enabling advanced filtering out of non-appropriate products for the specific user, and the advanced matching up of appropriate products, in accordance with the specific user's personal shopping profile and preferences. This advanced filtering enables a shop salesperson, for example, or the user themselves, to be presented with substantially appropriate products, optionally products that are currently available, rather than have the user select items that are non-appropriate, thereby wasting time and resources of shopping assistants and/or the shopper themselves.

At step 530 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. At step 535 feedback may be acquired from social networks or to which a user is connected, to help modify the user shopping profile. In some cases, advanced graphic processing and 3D rendering may be used for the user to virtually try on the product being researched, such that the user may see themselves dressed in the product in accordance with a digital simulation that places the product onto the user shopping avatar. As above, the user may use the shopping Avatar to provider further feedback to modify the user's shopping profile.

At step 540, a product may be ordered by an online user in a physical store. At step 550, a personalized product may be ordered by an online user in a physical store, for example, for a product that is in principle available but not currently in the store, or to enable manufacturing of a specifically required product based upon the user's shopping avatar, such that the product is a once-off customized product for a user.

In some embodiments, at step 545, a matchmaking of the user shopping profile to products being researched or required is executed, for user located in a physical store. At this step, the product data from product database 500 is matched to products being requested by a user, in accordance to the specific user shopping profile, thereby enabling advanced filtering out of non-appropriate products for the specific user, and the advanced matching up of appropriate products, in accordance with the specific user's personal shopping profile and preferences. This advanced filtering enables a shop salesperson, for example, or the user themselves, to be presented with substantially appropriate products, optionally products that are currently available, rather than have the user select items that are non-appropriate, thereby wasting time and resources of shopping assistants and/or the shopper themselves.

Figure 6:
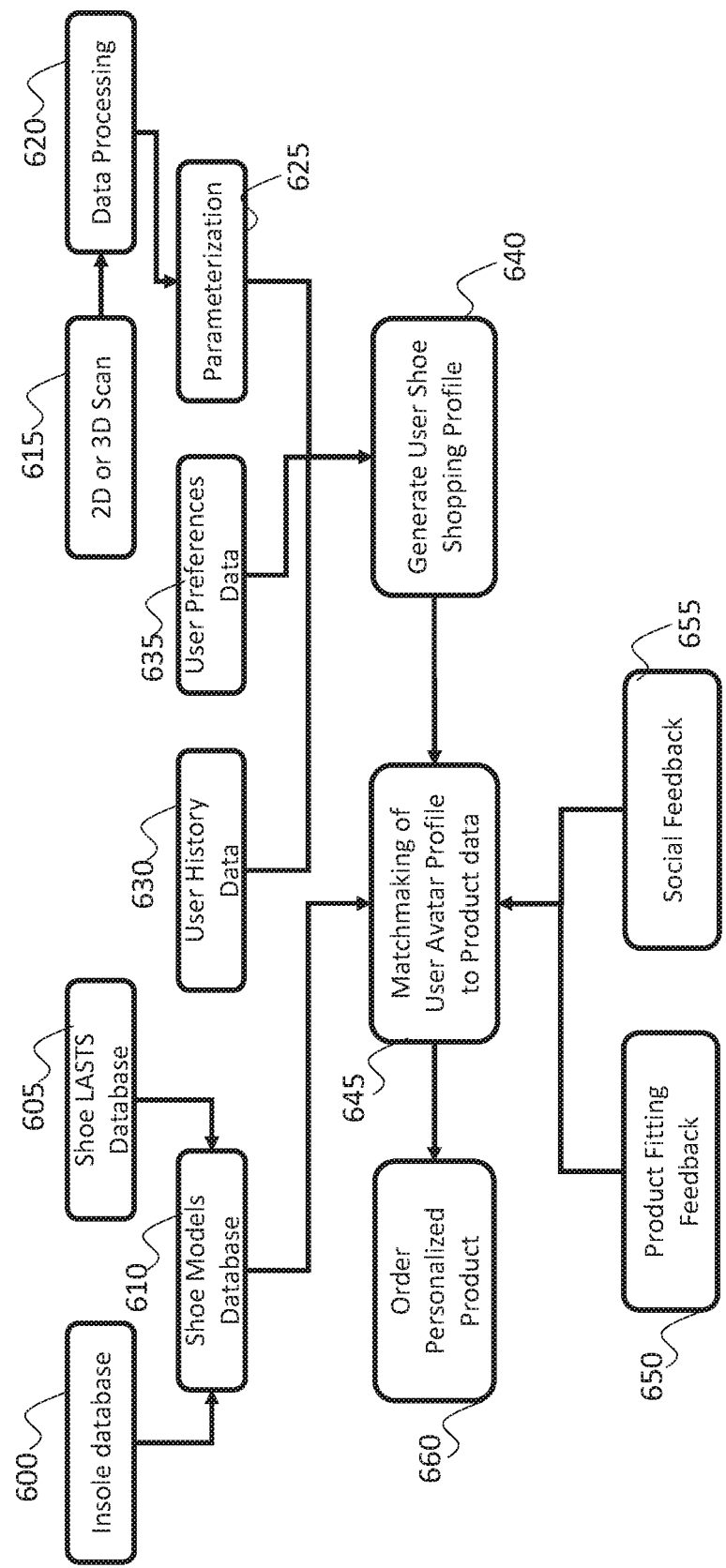
FIG. 6 is a flow diagram indicating an example of personalized shoes shopping, online or offline, according to some embodiments.

Reference is now made to FIG. 6, which is a flow diagram indicating an example of personalized shoes shopping, online or offline, according to some embodiments. As can be seen in the figure, insole information from an insoles product database may be acquired at 600. In addition, shoe last information from shoe lasts product database may be acquired at 605. In some cases, inner sole data, shoe last data and/or shoe model data may include data about each product's shape, volume, materials of shoes, closure type, shoe type, width, length, height, thickness, elasticity of materials, comfort fit etc. In some examples, mesh analysis and digitization may be provided, for example, to run a mesh analysis of each 3D last, combined with 2D DXF data, to be added to shoe last database 605. In addition, shoe model data for shoes to be discovered, purchased or manufactured may be acquired from shoe models database 610. In some cases, for example, 3D STL files may be imported for shoe lasts, and 2D DXF files may be imported for last bottoms.

At step 615, scanned or geometrical data may be acquired for a user, for example, from standard photographs, 2D and/or 3D image scanning, or from capture and processing using an automated shopping assistant apparatus etc. This graphic data may be processed at 620, by the personalized shopping system, over the cloud or in the unit itself, in order to generate a user's physical profile based on the user's physical properties. The profile may include all or some of the following attributes: a 3D mesh including the exact geometry of the profile, a 3D mesh including the exact geometry of one or more parts of the user's body, 2D images, properties calculated from one or more of the input methods, including specific volumes, cross section measurements, specific distances and lengths, as well as non-numeric attributes such as preferences etc. For example, a user's foot or both feet together may be pictured or scanned while standing on the floor or on another other surface, on or near a reference object, etc. Further, the user's foot or feet may be scanned by the camera scanning around the different angles of the feet, or by the person moving around the camera, thereby generating a 3D model, a movie or a series of pictures as reference. The scanned data may typically be processed, optionally including interpolation and/or cleaning, to allow for object identification and mesh generation, or other suitable processing means. In some cases, meshing may further enable removal of excess geometries and/or fixing of mesh errors, for example, including separation, identification and preparation of each of the feet, removal of the floor, pants or other excess materials from the scans etc. Scanned data processing may, in some cases, allow for feet alignment, which also helps separation or individualization of the two feet, to provide accurate measurement of both feet, including dimensional analysis to determine general and area specific lengths, width and height, and cross sectional analysis to determine area, perimeter, and other dimensions at specific cross sections. Scanned data processing may allow for smoothing of the edges of the scanned feet, building of missing volumes, constructing of the soles of the feet etc. In some cases, full foot volume and/or area specific volume may be extracted from the model as additional information. At step 625 the processed user scanned data may be parameterized, for example, to extract precise length, width, height, arch, ball, cross section, circumferences and volume dimensions etc. These parameters may be calculated off the clean 3D mesh using specific algorithms. For example, the calculation of the foot arch height off a model that was scanned in the standing position is complex and may be based on comparison of XYZ parameters of various anatomical parts throughout different cross sections in the center of the foot. The width of the foot may be calculated based on the volume of the toe box calculated both at a 3D mesh and 2D cross section level. The length of the foot may be calculated from a combination of the total length and the "ball length" which represents the distance between the heel of the foot and the 1st metatarsal. In addition, user specific conditions, such as sores, infections, damage etc. can also be identified and integrated into the user's shoe shopping profile. At this step, the pronation or supination condition of the foot may also be analyzed. Additionally, the arch of the foot may be identified and measured for fitting of support insoles or other prosthetics.

At step 630 history data for a user may be retrieved, for example, based upon previous user purchases in a store or chain of stores, whether from online and/or in store experiences. At step 635 user preference data may be acquired, such as size, color, material, type preferences etc. At step 640 a multi-dimensional user shoe shopping profile, hereinafter referred to as a user shopping avatar, may be created, by processing the various input data from steps 615, 620, 625, 630 and 635, thereby generating a user shoe shopping avatar or profile that includes user physical properties as well as user behavior and user preference data. In some embodiments the user shoe shopping profile includes both feet of the user, which are typically different and for which parameters are determined individually, thereby benefitting from individual profiles for left and right feet.

At step 645 a matchmaking of the user shoe shopping profile to shoe products being examined, researched or required is executed. At this step, the product data including dimensions, from product databases 600, 605 and 610 is matched to products being researched by a user, in accordance to the specific user shopping profile, thereby enabling advanced filtering out of non-appropriate products for the specific user, and the advanced matching up of appropriate products, in accordance with the specific user's personal shopping profile and preferences. The step of matching may be complemented by a provision of recommendations for the user, based on the above profile to she matchmaking process. This step may use the models of the foot and shoe digital profiles directly, and/or the parametrized numeric model.

At step 650 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. In some cases, advanced graphic processing and 3D rendering may be used for the user to try on the product being researched, such that the user may see themselves virtually dressed in the product in accordance with a digital simulation that places the product onto the user shopping avatar. As above, the user may use the shopping Avatar to provider further feedback to modify the user's shopping profile. At step 655 feedback may be acquired from social networks to which a user is connected, to help modify the user shopping profile.

At step 660, a personalized pair of shoes may be ordered by a user, whether inside a physical store or in an online store. Further, a personalized product may be ordered from a manufacturer who may produce a product based upon the user's request such that the product is a once-off customized product for a user. Customized footwear may be customized and/or personalized, for example, in of one or more of the following ways: shape (e.g., size, length, geometry, volume), design (e.g., colors, patterns, print, materials) or any other specification or combination of the above.

Figure 7:
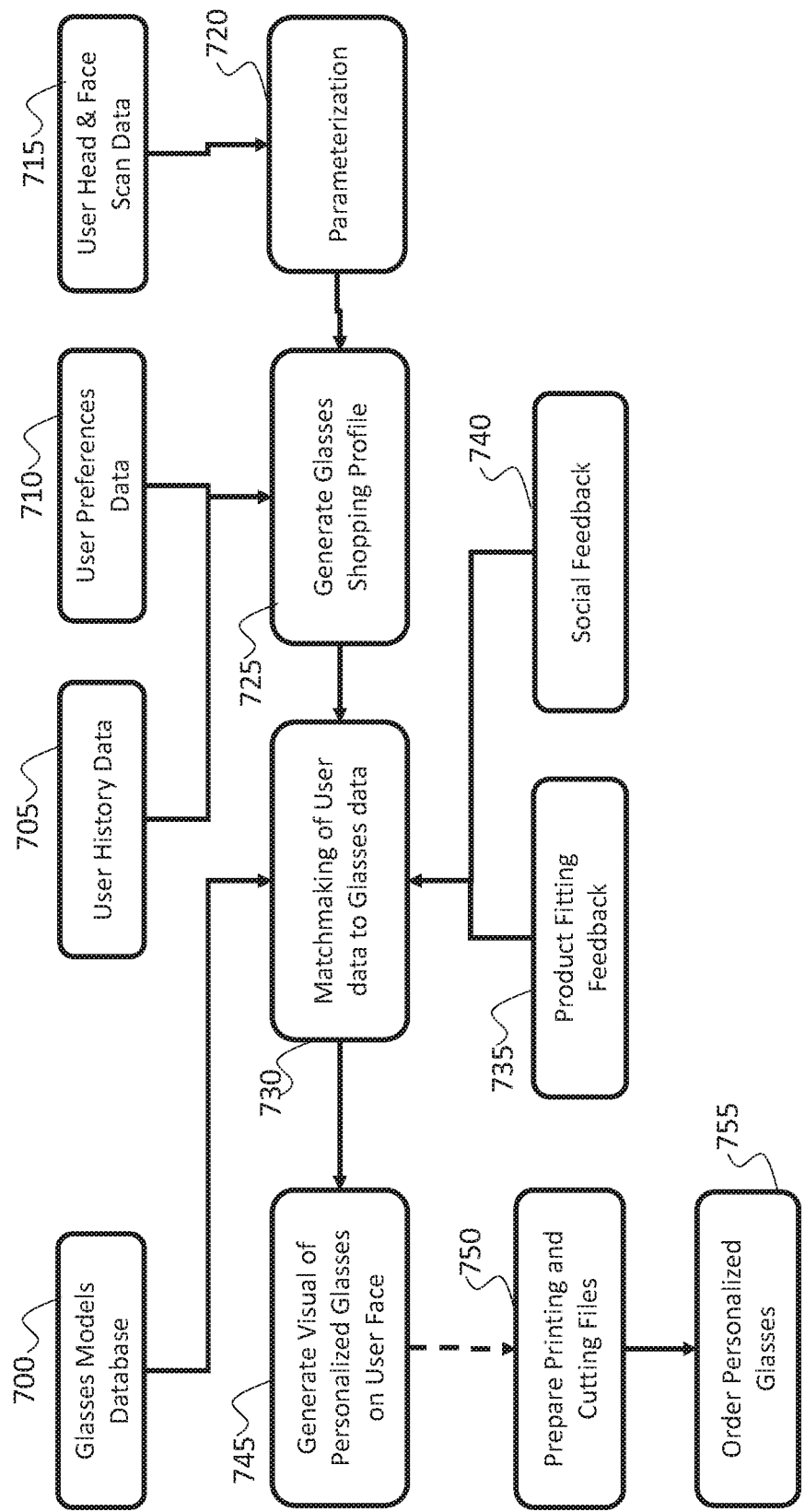
FIG. 7 is a flow diagram indicating an example of personalized eyewear shopping and manufacturing, online or offline, according to some embodiments.

Reference is now made to FIG. 7, which is a flow diagram indicating an example of personalized eyewear shopping and manufacturing, online or offline, according to some embodiments. Eyewear can include, but is not limited to, sun glasses and any type of optical glasses. As can be seen in the figure, glasses models information from glasses product database may be acquired at 700 from a glasses models or products database of various file types or data structures. According to some embodiments, glasses frame acquisition may be enabled by preparing parametric models, for example, by generating model parameters for multiple to input types, handling resolution adjustment, enabling automatic rigging and skinning, integrating range of motion animation and corrective shape-keys etc.

At step 705 history data for a user, for example including facial anatomical landmarks and measured distances such as inter popular distance, location of each eye, cheek, temple, and various points on the ear and the nose etc., may be used. The general parameters of each face are also loaded, optionally including the volume, proportions and standard shape, may be retrieved, for example, based upon previous user examinations and/or purchases in a store or chain of stores, whether from online and/or in store experiences. At step 710 user preference data may be acquired, such as size, color, material, type preferences, usage needs etc. This data may be acquired directly or indirectly, for example, using purchase information, questionnaires, forms and/or any other data acquisition method.

At step 715, scanned or graphic data may be acquired for a user, for example, from standard photographs, 2D and/or 3D image scanning, or from capture and processing using an automated shopping assistant. This includes, for example, any type of 3D scanning technology, as described in the above section or alternative 2D method using or not using reference objects for sizing. Typically, user head and face scan data may be acquired at this stage. In some embodiments, head and face model preparation and analysis may include model preparation such as smoothing and cleaning, rebuilding of the mesh with enhanced topology and/or optimized detail/weight ratio compression for optimal display in real-time, and/or orientation and alignment. Further, facial feature recognition may be used, for example, to generate a facial model rendered from multiple angles (e.g. 3 to 15 angles, to help determine Normal, Depth, Color). Moreover, computer vision and/or machine learning algorithms may be applied, for example, to identify the Eyes, nose, nose bridge, temples, ears etc. The processing of the scanned data may further include projection of 2D Landmarks to the 3D Model, and validation of anatomical landmarks. In the case of absent landmarks, an assessment based on statistic or empiric results may apply for replacement of these landmarks.

At step 720 the processed user scanned data may be parameterized, for example, to extract the precise face length, width, height, proportions, nose width and volume, ear size, ear height, ear position, skin color, and/or other relevant facial characteristics and dimensions etc. This data may be processed by the personalized shopping system at 725, together with the user history data from 705 and user preferences data at 715, to generate a user's glasses shopping profile based on the user's face profile and other physical properties, as well as user behavior and user preference data. In some embodiments the user glasses shopping profile includes both eyes of the user, which are typically different, thereby benefitting from individual profiles for left and right eyes. In some embodiments the optical prescription will be collected using a picture, an e-form, or an embedded testing method inside the application, or in some cases from external prescription files. According to some embodiments, the system may recommend specific models based on the face shape, previous purchases and history and optionally based on a comparison (optionally anonymous) to similar avatars.

At step 730 a matchmaking of the user glasses shopping profile to the glasses products being researched or required is executed. At this step, the product data from product database 700 is matched to products being researched by a user, in accordance to the specific user shopping profile, thereby enabling advanced filtering out of non-appropriate products for the specific user, and the advanced matching up of appropriate products, in accordance with the specific user's personal shopping profile and preferences.

At step 745, each frame is adjusted to fit on a user's face using frame Customization, that may include, for example: Taking key measurements on a subject or user's face; applying iterative comparison algorithms to adjust the frame to the face; digitally positioning the frame on the subject's face, orienting the frame appropriately to the face, scaling nose bridge size, width and position, adjusting arm folding, arm length and pantoscopic tilt or angle, in accordance with the subject's face, as per the prepared user glasses shopping profile or avatar, etc.

At step 735 product fitting data from feedback of physically present personnel or remote people may be used to help modify the matchmaking of user data to product data, for example, the feedback from a salesperson or optometrist in a store may be used to update the user profile, or the feedback from remote people connected via a smart phone or computer for example. In some cases, for example, salesperson or friend feedback, such as which colors look good on a person or which size, style, type looks best etc. may be used by the user to update their shopping profile.

In some embodiments, at step 745, advanced graphic processing may be used for the user to virtually try on the product being researched, such that the user may see themselves dressed in the glasses in accordance with a digital simulation that places the glasses onto the user shopping avatar's face. The virtual try-on may, in some embodiments, include features such as physical simulation that positions the glasses at the correct or optimal position and can slide these along the nose. In addition, the try-on may include an overlay of a picture or 3D model on top of the face model/or a series of pictures or any combination of the above. Animated effects may be included to emphasize the different attributes of the glasses including customization animation in the case of custom frames, or other animation such as fly in/fly out animation for switching between pairs. As above, the user may use the shopping Avatar to provider further feedback to modify the user's shopping profile. In some embodiments, the user may view the customized frame on a digital version of his/her face, to provide profound visual feedback. For example, the user's face may be shown in a 3D viewer and the appearance may be enhanced, so as to provide one or more of 3D view manipulation (e.g. zoom, rotation), and animated effects to compliment user experience, such as a breathing face, smile, blinking or other animated or static visual effects. Further, the user may thus be provided with customization options including choosing any frame from the collection, customizing the frame and lens colors, customizing an automatic recommended fit, personalization of a file (e.g. text, prescription etc.), and enabling side-by-side comparison between different frames. At step 740 feedback may be acquired from social networks or to which a user is connected, to help modify the user shopping profile Of course, other steps of combinations of steps may be used to process the input data.

Step 750 refers to a variety of embodiments in which the system enables production of custom eyewear based on automated or semi-automated parametric design of the frame to fit the user. At step 750 relevant glasses production printing and cutting files may be prepared by the system, if necessary. In some embodiments, 3D printing files of standard forms for examples STL or OBJ and 2D lens cutting files such as DXF etc. may be prepared. In some embodiments the system creates two or more pairs of models for each of the frame designs. This allows, for example, for a light weight model to be used for visualization purposes on the frontend of the application while maintaining a high resolution model for the printing file preparation, that may include, for example, high resolution features and details, such as hinges, grooves, angles, ear pieces etc. The eyewear customization of print models described herein may be automatic and/or manual. Further, the file preparation for 3D printing may include automatically fixing of printability issues, generation of normal, duplicates, holes and non-manifold geometry etc. In some embodiments the system may create custom tags on the glasses or eyewear, for example, including text, QR or barcode that would allow traceability throughout the production and distribution process.

At step 755, a personalized pair of glasses may be ordered by a user, whether inside a physical store or an online store. Further, a personalized product may be requested from the store, or ordered from a manufacturer who may produce a product based upon the user's request such that the product is a once-off customized product for a user.

According to a number of embodiments, a system and process are described for automated personalized product ordering using a digital mirror or personalized viewing protocol. Virtual reality and/or augmented reality may be integrated to manipulate, view and/or try on designated equipment such as existing or designed glasses, on a screen, table, smartphone, communications device etc., to allow visual representation of the custom or non-custom frames on the face of the client.

According to many embodiments, a file format adapted to enable personalized product ordering is provided. This file format incorporates all of the relevant information, including physical properties and personal preference, to represent a user and help the user perform personalized custom or non-custom shopping for clothing, eyewear, footwear, or other body related products. This avatar standard format may be used to plugin into substantially any shopping platform, online or physical, to allow customization of the store to fit the physical and aesthetics needs and preferences of a customer.

Reference is now made to FIGS. 8A-8G, showing different views of a POS apparatus, Launchpad or kiosk, according to some embodiments. In some embodiments, the shopping assistant apparatus generates a user avatar based on one or more of 3D scanning, image acquisition using one or more cameras, measuring a user profile with pressure plates, etc. In some embodiments, a standing pad may be used to function as a positioning pad or reference for a user to stand on to perform a body scan. In some cases, the standing platform may include lighting at the bottom of the standing pad, to support acquisition accurate measurement of any colors from cameras or scanners on the apparatus, by minimizing or marginalizing shadows, and causing a black/white perimeter effect. In some embodiments there may be a proximity sensor for each foot—to measure if the feet are in place or close, and tell the user to move if necessary. Further, the apparatus may include a distance or proximity sensor/robot that recognizes approaching user to attract the user to the apparatus, in which case the apparatus may be automatically started when a user enters a selected geographical zone. In several embodiments, a sensor may be used for measurement of the height of a user's instep—to establish instep volume, for example. In many embodiments, specialist sensors may be used, for example, sensors to measure diabetes sores etc. Such sensors, such as cameras, 3D sensors, all around cameras, and or multiple cameras may be used.

Figure 8A:
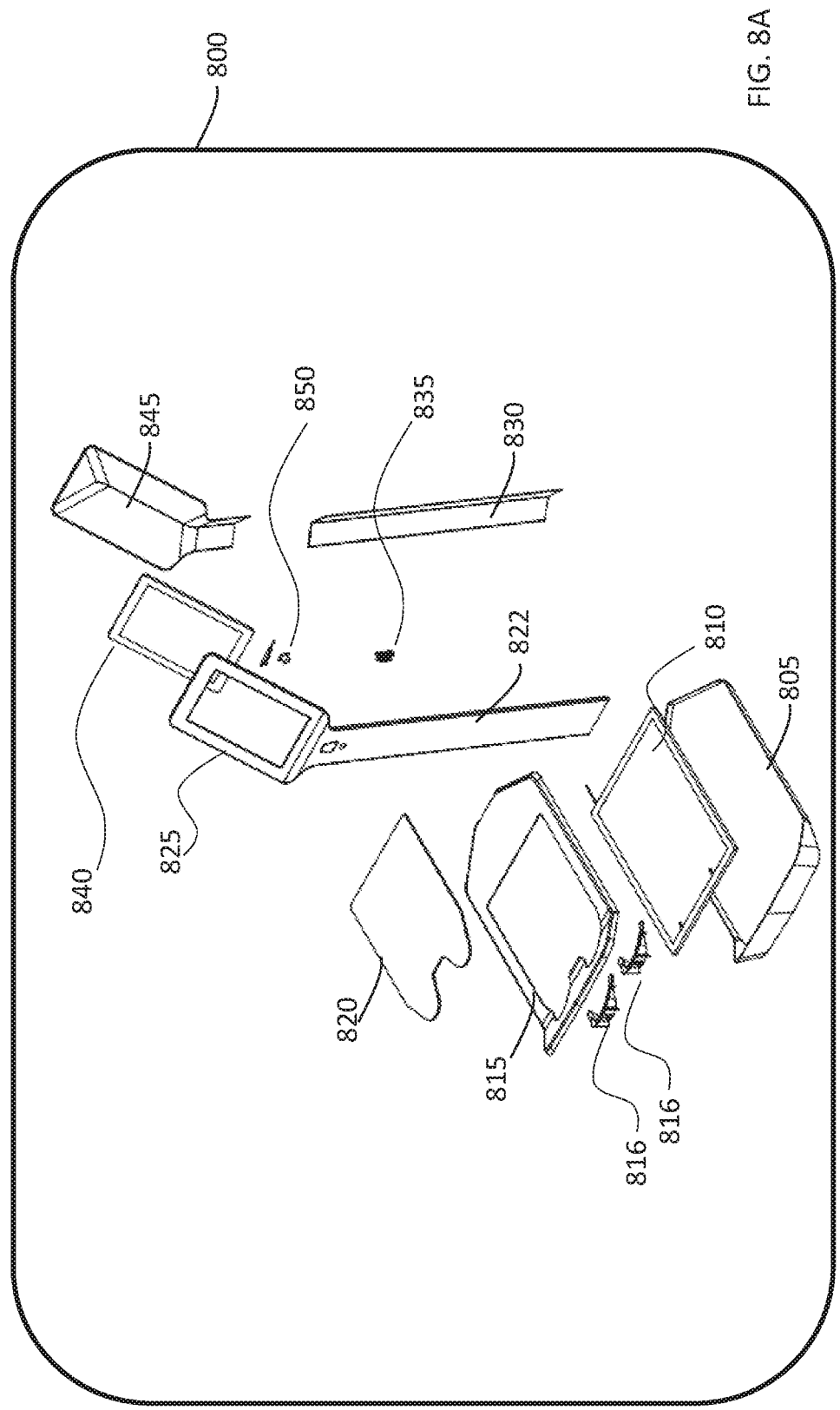
FIG. 8A shows an exploded view of an example of a shopping assistant apparatus, according to some embodiments.

FIG. 8A is an exploded view of an example of the components of the POS apparatus or Kiosk device, in some embodiments. As can be seen, the kiosk device 800 may include a standing base 805, a light source for optionally lighting the standing base 810, proximity sensor(s) 816, for identifying the positioning of feet to be scanned by kiosk device 800, a standing pad 815, with space for standing on with both feet, and a pad layer 820, on which the feet are mounted on. In some embodiments pad layer 820 may be integrate a pressure sensing mechanism, such as flatbed scanner; plate of pins; pressure plate; touch screen type surface with a capacitor and/or pressure sensor element etc., to determine foot arch dimensions. In some embodiments, arch dimension measurement element(s) may be used to determine a need for and/or dimensions of an inner sole(s) for a user.

In some embodiments, arch dimension measurement element(s) may be used to determine a need for and/or dimensions of a user's instep profile.

In some embodiments, arch dimension measurement element(s) may be used to determine a need for and/or dimensions of a user's ball (of the foot) profile.

In many embodiments one or more lasers or other lighting mechanisms may be used to determine foot arch, ball, or in step dimensions. In one example, a laser from above the foot may be used to show the height or arch and also size of a bridge of the foot, for example, by identifying the size of the "hidden" area not seen by laser, and using the "hidden" space to determine parameters such as height, at different points on the foot. In a further example, diffraction grating, prism, or other filters to use multiple lines to be able to identify highest point of foot.

In several embodiments, one or more lights, optionally of different colors, separately and/or in combination, may be used, together with image processing to neutralize a color of a sock and/or foot, and help identify non-foot space. In many embodiments one or more may be identified with the arch of a foot, for example, using a background elimination technique.

Further, kiosk device 800 may include a main body 822, including a computer holding stand 825, and a camera holding element 826, for holding one or more camera elements 835, a panel element 830, a further panel or cover element 845, a computing screen, preferably a touch screen PC or tablet 840, and optionally having a place for setting up a proximity sensor 850, for example, for identifying a user proximity to the computing device.

Figure 8C:
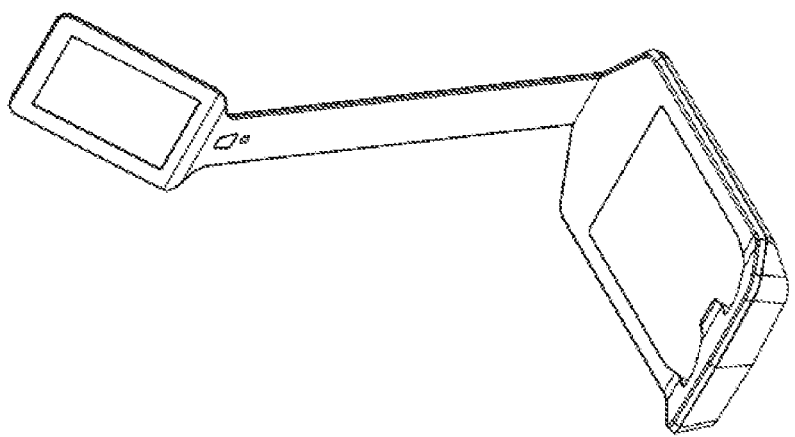
Figure 8B:

FIG. 8B is a front view of an example of the POS apparatus or Kiosk device.

FIG. 8C is an isometric view of an example of the POS apparatus or Kiosk device.

FIG. 8D is an isometric front view of an example of the POS apparatus or Kiosk device.

FIG. 8E is an isometric back view of an example of the POS apparatus or Kiosk device.

Figure 8G:
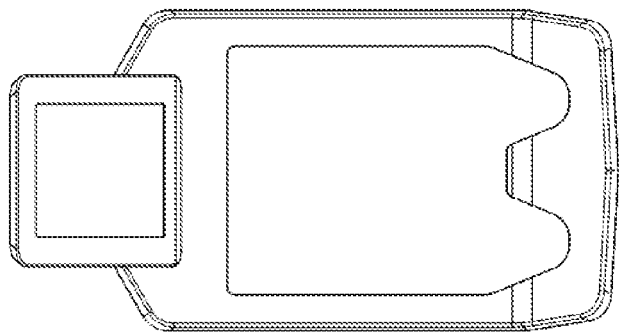
Figure 8F:
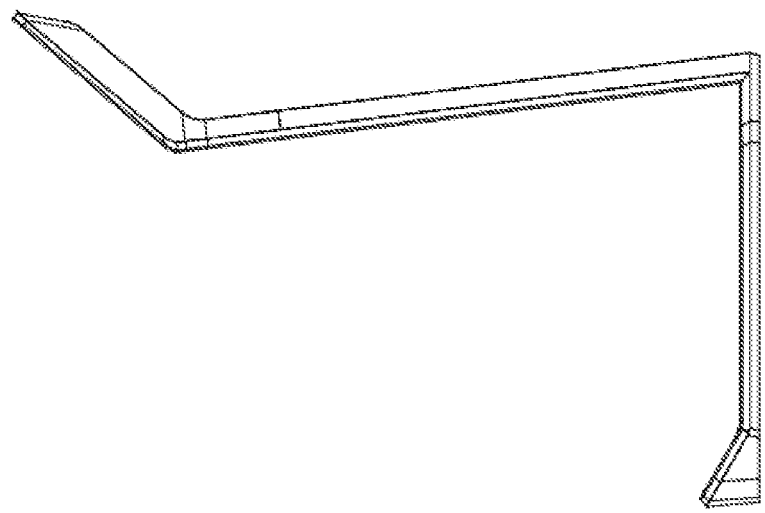

FIG. 8F is a side view of an example of the POS apparatus or Kiosk device.

FIG. 8G is a top view of an example of the POS apparatus or Kiosk device.

Figure 8H:
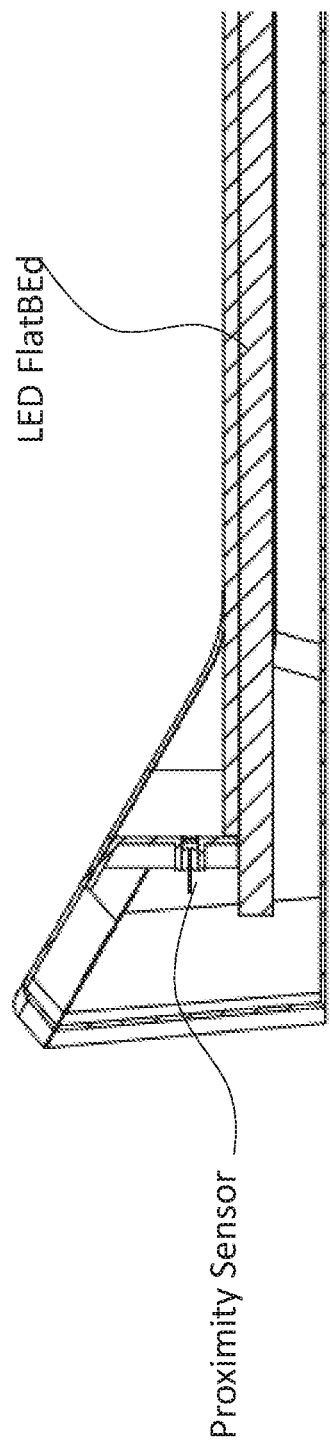

FIG. 8H is a view of an example of one or more sensors in POS apparatus or Kiosk device.

As can be seen, the kiosk device, multiple sensors may be configured, for example, one or more proximity sensors, a LED flatbed may be configured for providing a light source from under the standing area.

Figure 9:
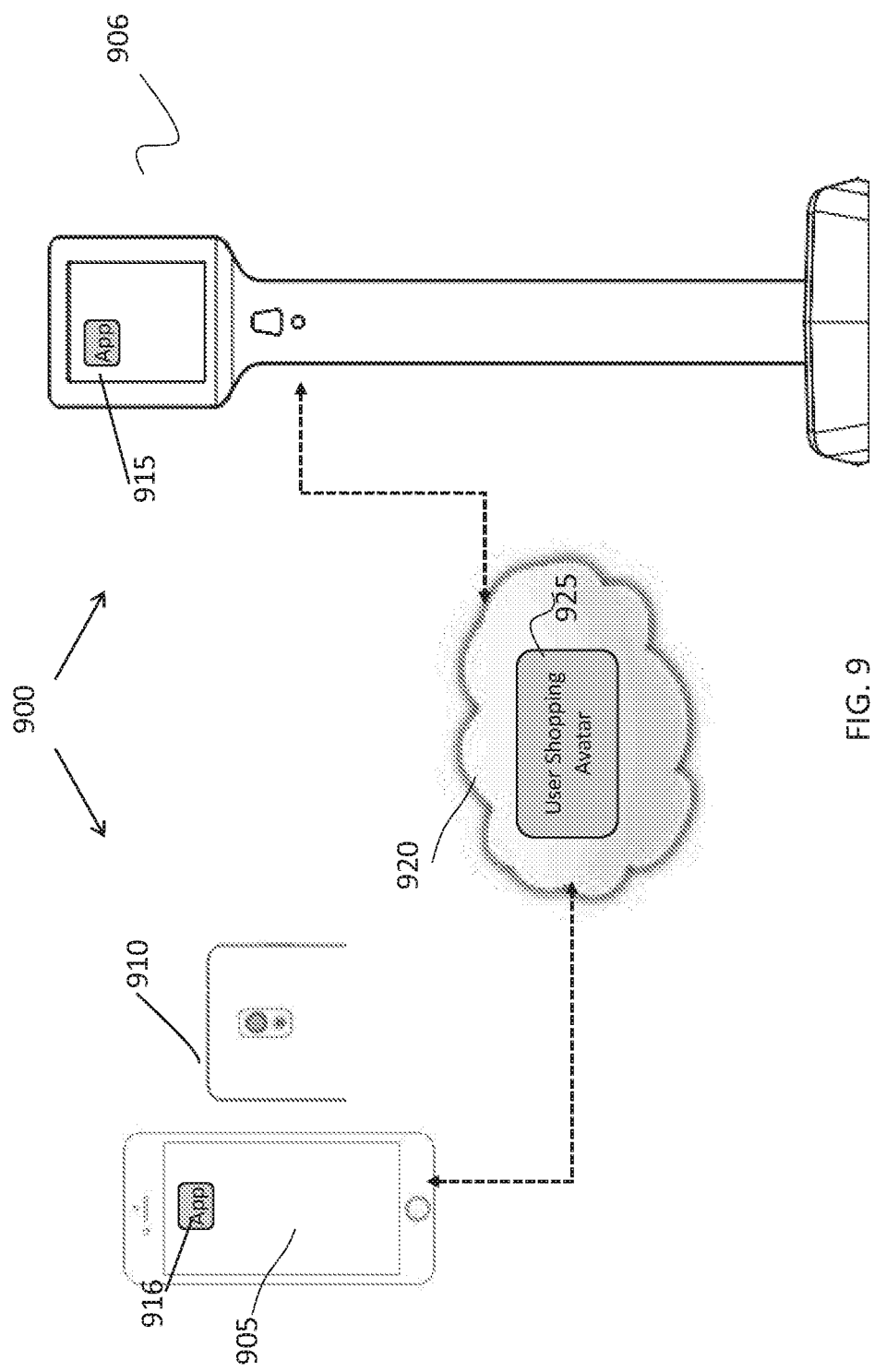
FIG. 9 shows a shopping assistant system, according to some embodiments.

Reference is now made to FIG. 9, which shows a schematic view of the shopping assistant system 900, including automated shopping assistant apparatus 906, which integrates a computing component adapted to run a shopping assistant application or software program 915. Automated shopping assistant apparatus 906 is adapted to connect to a communications network, such as communications cloud 920, to access the user shopping profile 925, if on the cloud, and/or transmitting the user shopping profile to the cloud.

Further, a remote user mobile device, such as a smart phone, tablet or other camera supporting mobile communications device 905, 910, according to some embodiments, which are adapted to run a shopping assistant application or software program 916. Devices 905 and 910 typically include one or more cameras 910, for example to enable capturing information about a person's foot or both feet optionally simultaneously using a standard picture/scan, video, series of pictures or advanced sensing components such as structured light, time-of-flight or others in IR/NIR or visual light conditions. Devices 905/910 typically include a gyrometer to provide camera orientation data to the device camera, for example, to only allow a picture to be taken when the camera is substantially flat. In some embodiments, internal sensing components and/or additional sensors may be attached to the communications devices 905, 910 to supply supplementary data to the system. For example, such sensors may assist in improving accuracy of measurements, assisting the user during the capturing of the data with real-time feedback, and/or providing input to the calculation engine. Remote devices 905 and 910 may communicate with communications cloud 920, and in particular, may be connected to the device user's digital shopping avatar or profile 925. In some embodiments, a user may generate the shopping profile using the mobile device 905,910, for one or more users, in addition to or in place of the automated shopping assistant apparatus 906

Reference is now made to FIG. 10, which shows a schematic view of the shopping assistant system 1000, and the work flow between the components. As can be seen, the launch pad or shopping assistant apparatus 1005 can scan a user, for generation of a shopping profile for the user. The generated profile is sent to the user's mobile device 1010, and can subsequently be used for scanning products, such as shoes 1015, optionally via a product tag, such as QR code 1020, representing the selected product. Further, in some embodiments, the user may build a shopping profile using a mobile Application 1025. In some embodiments the user shopping profile can be used to augment in store shopping, at 1030. In some embodiments the user shopping profile can be used to augment online shopping, at 1040.

Figure 11A:
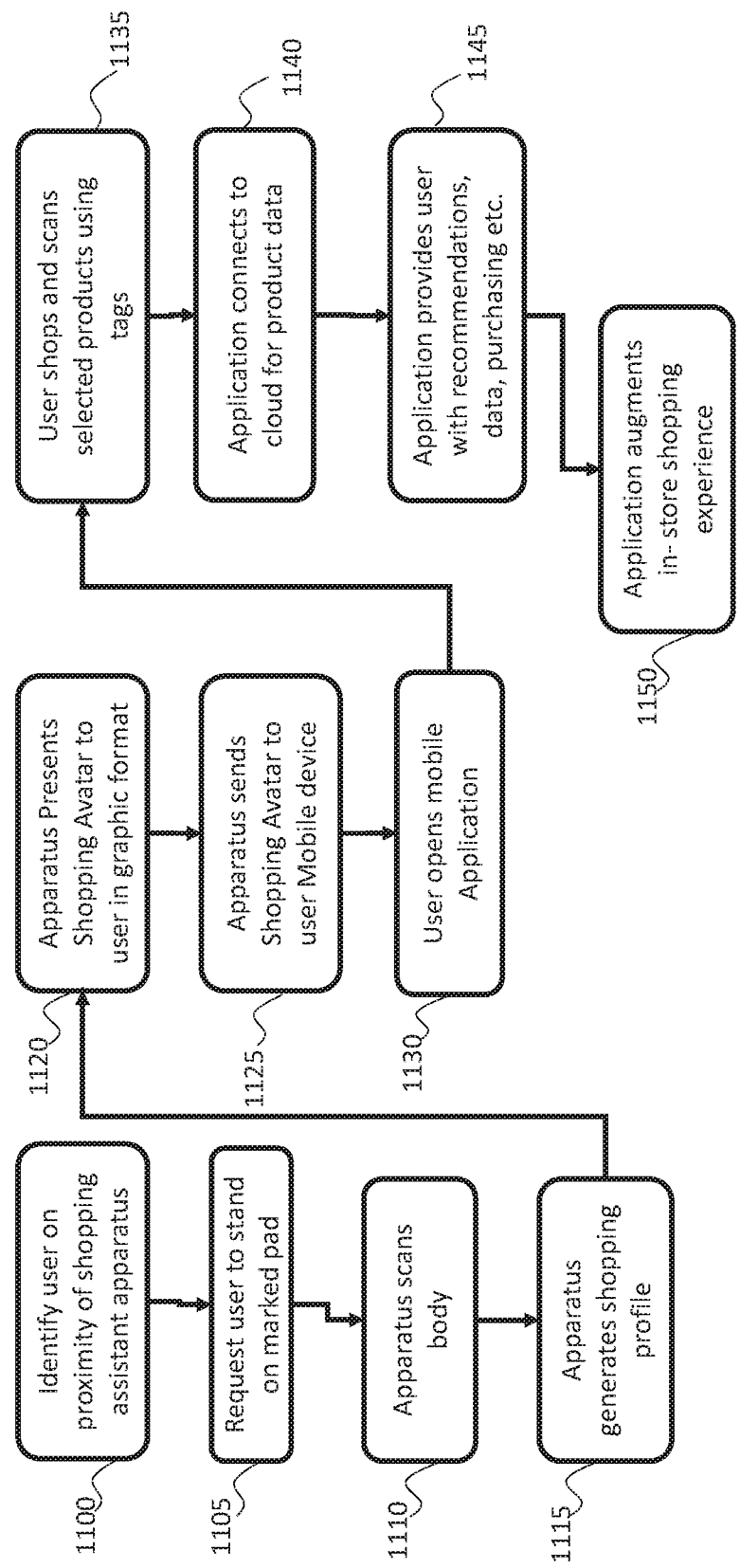
FIGS. 11A and 11B describe examples of a process of shopping assistant usage, according to some embodiments.

Reference is now made to FIG. 11A, which is a flow diagram indicating an example of personalized footwear shopping in a shopping store using an in store or POS automated shopping assistant apparatus, in combination with a mobile computing device application. As can be seen, at step 1100, a user may be identified via a proximity sensor of a shopping assistant apparatus, and at step 1105 the user may be requested to stand on the marked pad, and optionally provides interactive guidance to make sure the user stands in the correct position to enable accurate scanning. At step 1110, the apparatus scans the body or body parts/elements, and at step 1115, generates a shopping profile based on the scan. At step 1120 the apparatus may present the shopping avatar to the user in a graphic format. At step 1125 the apparatus may send the shopping avatar to the user's mobile device. At step 1130 the user may open a shopping application that may use the application to assist with shopping and/or research. At step 1135, the user may use the avatar on their mobile device to shop or do research, for example, by scanning selected products using coded tags, for example, QR codes or barcodes. In general, the scanned products may be processed in a way that relates to the user avatar, for example, to determine if the product will fit the avatar, suits the user's profile or preferences etc. In some cases, the application may provide a graphic simulation of the selected product on the avatar. At step 1140 the application may connect to a communications cloud or other data base, to match the selected product(s) with product data, for example, to help determine purchasing options, inventory status, product qualities, product features, reviews, sizes etc. In some cases, at step 1145, the application may present the user with recommendations, purchase data etc. In still further steps, the application may augment the in-store shopping experience, for example, by providing shopping advice, options, shortcuts, access to additional databases etc.

Figure 11B:
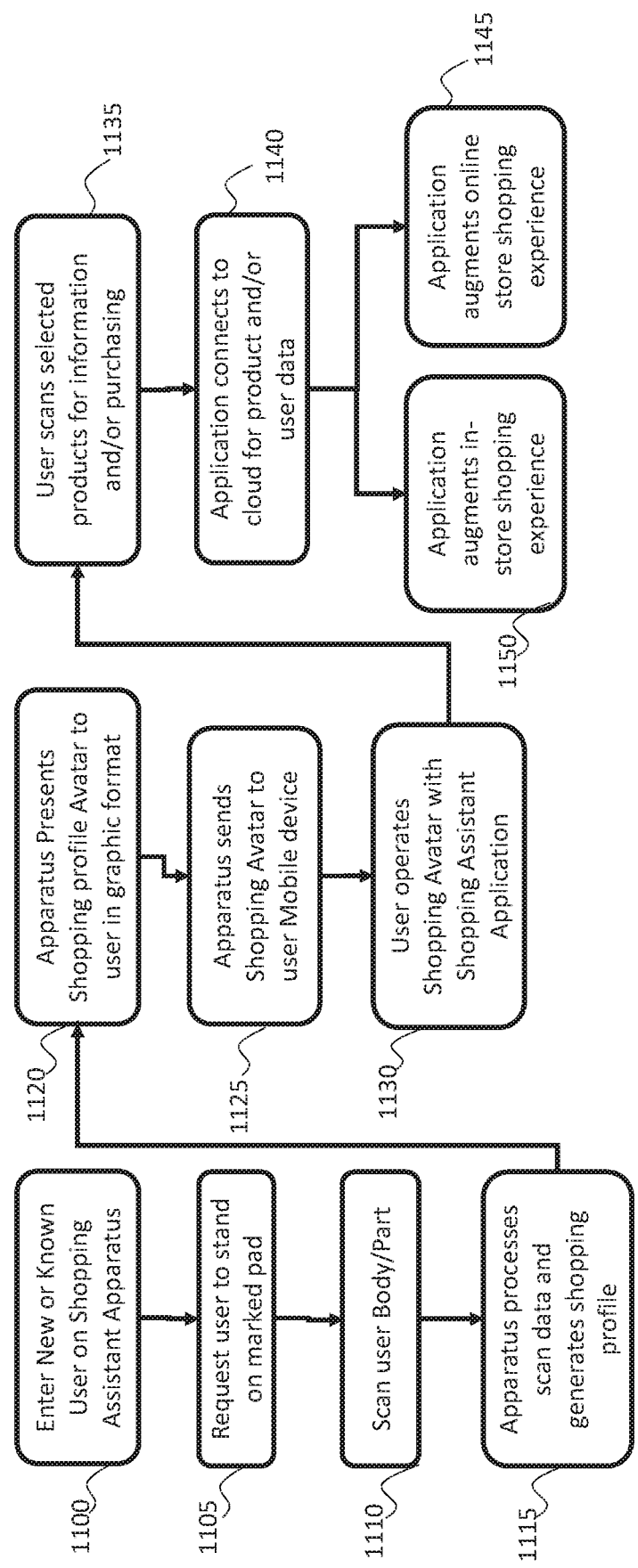

Reference is now made to FIG. 11B, which is a flow diagram indicating an example of personalized footwear shopping in a shopping store using an in store or POS automated shopping assistant apparatus, in combination with a mobile computing device application. As can be seen, at step 1100, a new or known user can be entered on the shopping assistant apparatus—for example, via a biometric identifier, entry screen etc. At step 1105 the user may be requested to stand on the marked pad, and optionally provides interactive guidance to make sure the user stands in the correct position to enable accurate scanning. At step 1110, the apparatus scans the body or body parts/elements, and at step 1115, processes the scan data and generates a shopping profile based on the scan. At step 1120 the apparatus may present the shopping profile as a simulation, shopping avatar or other virtual assistant, to the user in a graphic or other format. At step 1125 the apparatus may send the shopping avatar to the user's mobile device, in a format or configuration usable by the device's software, code or application(s). At step 1130 the user may open a shopping application or other program that may operate the shopping avatar with a shopping assistant application. At step 1135, the user may use the avatar on their mobile device to shop or do research, for example, by scanning selected products using coded tags, for example, QR codes or barcodes. In general, the scanned products may be processed in a way that factors in the generated shopping avatar, for example, to determine if the product will fit the avatar, suits the user's profile or preferences etc. In some cases, the application may provide a graphic simulation of the selected product on the avatar. At step 1140 the application may connect to a communications cloud or other data base, to match the selected product(s) with advanced product data, for example, to help determine purchasing options, inventory status, product qualities, product features, reviews, sizes etc. In other cases, at step 1140 the application may connect to a communications cloud or other data base, to match the selected product(s) with advanced user data, for example, to help determine user preferences, user history, user profile updates etc. In some cases, at step 1145, the application may present the user with recommendations, purchase data, purchase choices, reviews, news etc., to help augment the online store shopping experience. In some cases, at step 1150, the application may present the user with recommendations, purchase data, purchase choices, reviews, news etc., to help augment the in-store shopping experience, for example, by providing shopping advice, options, shortcuts, access to additional databases etc.

In some embodiments, the user shopping experience may be executed for additional users connected with a user of the shopping assistant. In such cases, the user application may contain shopping profiles of multiple users, thereby allowing the user of the mobile device to execute shopping for multiple users in according to the users' shopping profiles.

In accordance with some embodiments, mobile and/or user avatars may be shared with other users. For example, a user may have access to or control multiple user profiles, with the users' authorization, for example, in a wallet or holder of avatars or profiles. In such a case, the controlling user may shop on behalf of other users. For example, a parent may keep the profiles of all their family members, allowing the parent to easily shop online and/or offline for all the associated family members.

In accordance with some embodiments, additional personalization can be provided for each user mobile shopping avatar or user shopping avatar, such as an icon or picture. Such personalization may be particularly useful for a controlling user to manage multiple user or mobile shopping avatars. This information associated with any identifier may be saved on the cloud avatar database and associated with a user in any platform that s/he uses. For example, in the case where a family member scans and saves one or more of his or her family members profiles, these may be shared with another family member(s) who can now load them into an in-store system or an ecommerce website being used, and subsequently use this personalized information. In the case of a website, the output may be personalized in accordance to this personalized data and may even include the other user's picture or avatar or 3D model right next to the information provided, to reassure the user's confidence that the recommendations are personal and based on his or her profile, or other profiles being legitimately used by the user.

In accordance with some embodiments, an online store may include a user shopping virtual assistant, using a profile plug in or other digital object, that may appear on substantially any webpage (whether optimized for mobile phone, desktop, notebook, tablet, wearable etc.), when relevant, to offer recommendations, guidelines or other assistance to the user. For example, the virtual shopping assistant may show information about different fits for the user profile being used, or otherwise assist the user. For example, a user with a foot size of 41 European, while shopping or browsing in the Nike online store, may be informed that the equivalent size for their feet profile in Nike shoes is 42 European or US size 10.5. Additionally, if the user profile includes preference data, such as preferred colors and fits etc. the shopping virtual assistant may also provide suggestions or guidelines based on the user preferences. For example, in the Nike shoes store, the shopping assistant may suggest to the user to look for options that are 10.5 American size, in athletics shoes, in either blue or green, etc.

In some embodiments the virtual assistant may take the user directly to a page or pages that match the user shopping profile data and preferences. In several embodiments, the profile may direct the website into the sections that are interesting or relevant to a specific user while avoiding irrelevant pages. In many embodiments, the system may use the personalized information, alone or in aggregate with additional users, to rearrange the website and create a personalized version of the website that may represent what s/he may be most interested in and what would best fit for him or her.

In accordance with some embodiments, the virtual shopping assistant may enable rendering of 3D views of a product being viewed, and optionally of a personalized product. For example, a custom shoe being viewed in accordance with a user's shopping profile may be rendered in 3D from all sides and angles, to assist the user is viewing the product from multiple dimensions.

In accordance with some embodiments, a virtual fitting module may be provided, to allow dressing of the shopping avatar with the product(s) being viewed.

In accordance with some embodiments, a user shopping avatar may be a once off avatar for a store. In many embodiments the user shopping avatar may be applicable to a chain of stores. In several embodiments the user shopping avatar may be applicable to a variety of brands or stores, for example, all owned by a parent entity. In many embodiments the user shopping avatar may be applicable to any or all stores, via connecting to the universal user profile in the cloud.

Figure 12B:
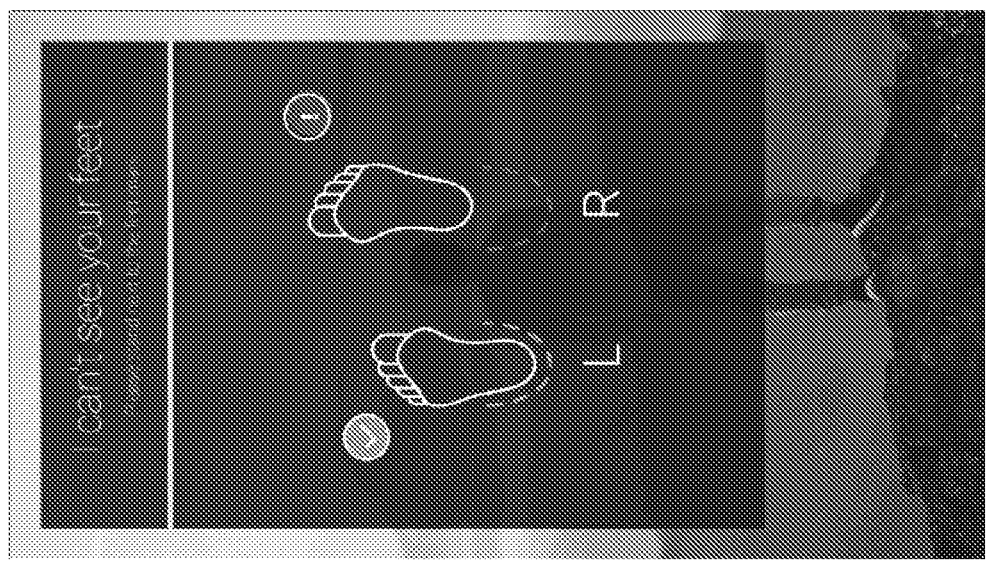
FIGS. 12A-12B are examples of screenshots showing interactive screens on the shopping assistant screen, for guiding a user to place their feet on the marked pad, according to some embodiments.
Figure 12A:
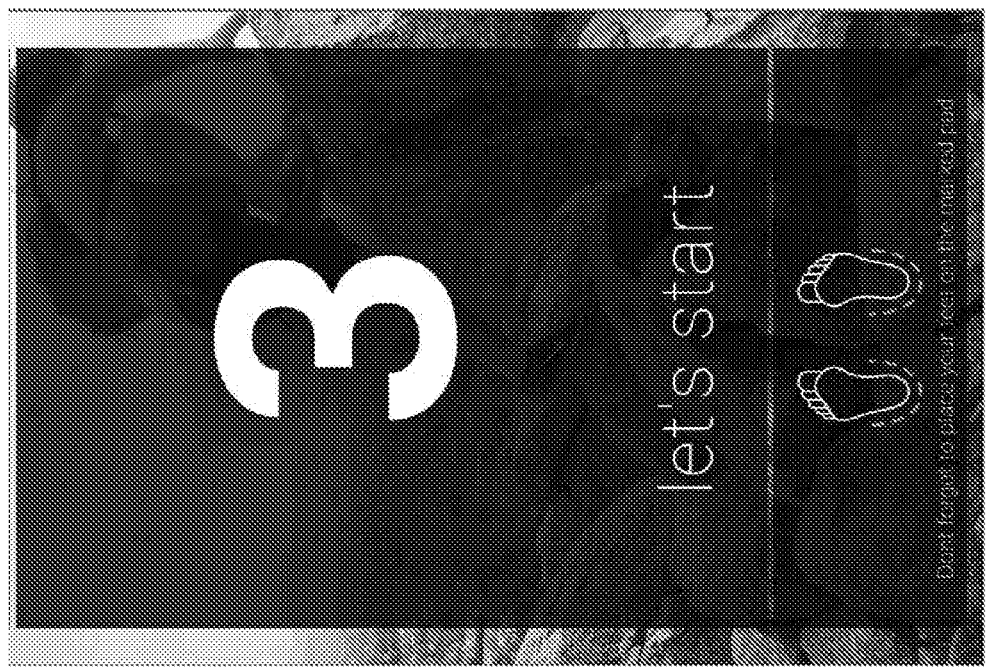
Figure 13B:
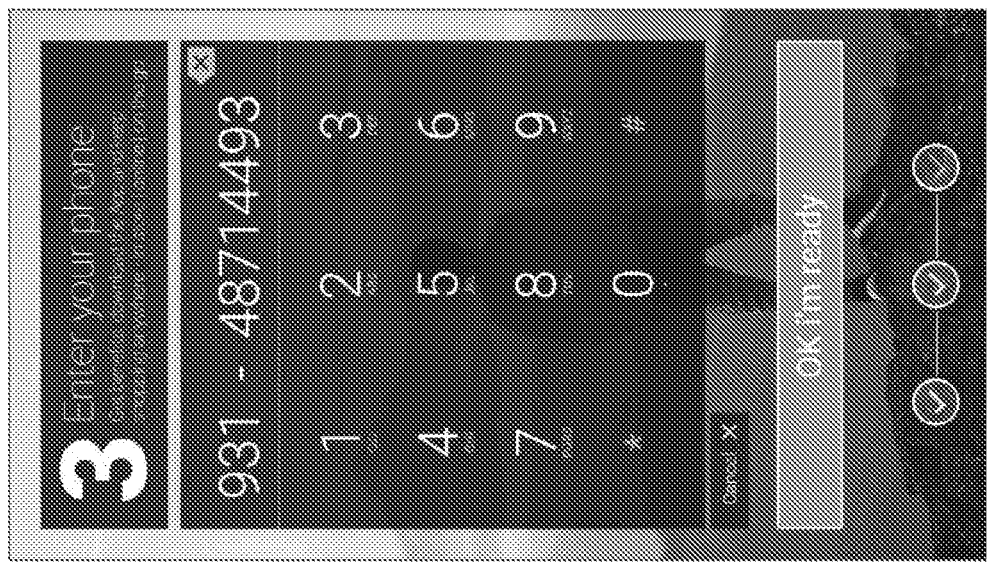
FIGS. 13A-13B are examples of screenshots showing an interactive guide on the shopping assistant screen or mobile screen, for helping the user to define their profile, and their contact information, according to some embodiments.
Figure 13A:
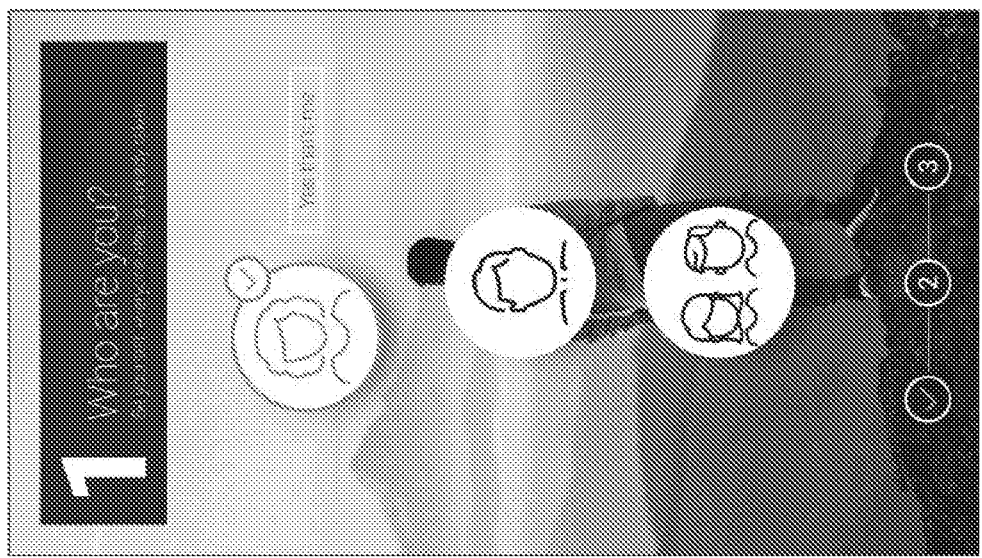
Figure 14B:
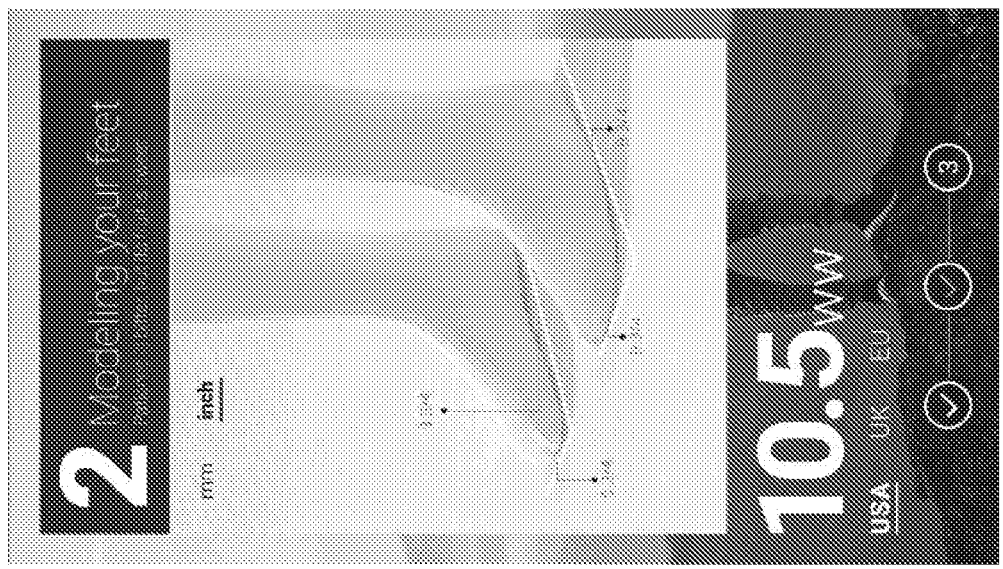
FIGS. 14A-14B are examples of screenshots on the shopping assistant screen or mobile screen, for showing a simulated rendition of a pair of scanned feet and lower legs, according to some embodiments.
Figure 14A:
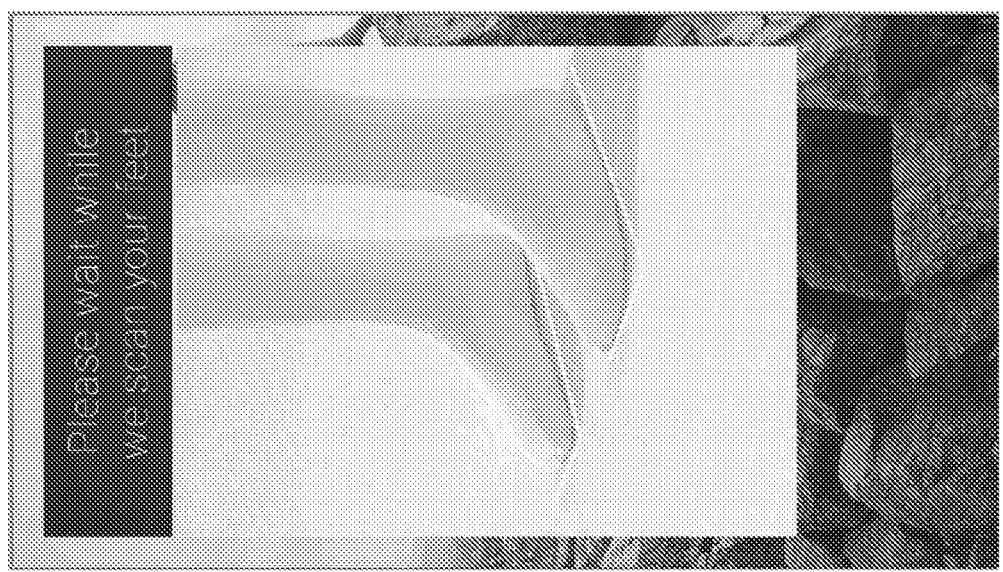
Figure 15B:
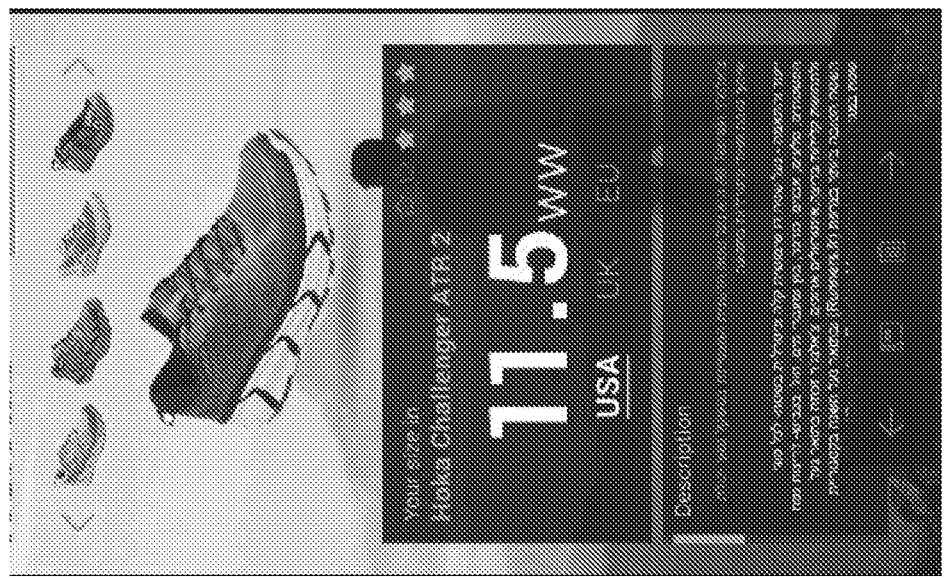
FIGS. 15A-15B are examples of screenshots on the shopping assistant screen or mobile screen, for assisting a user in entering behavior related information, that may be used to provide better user related output.
Figure 15A:
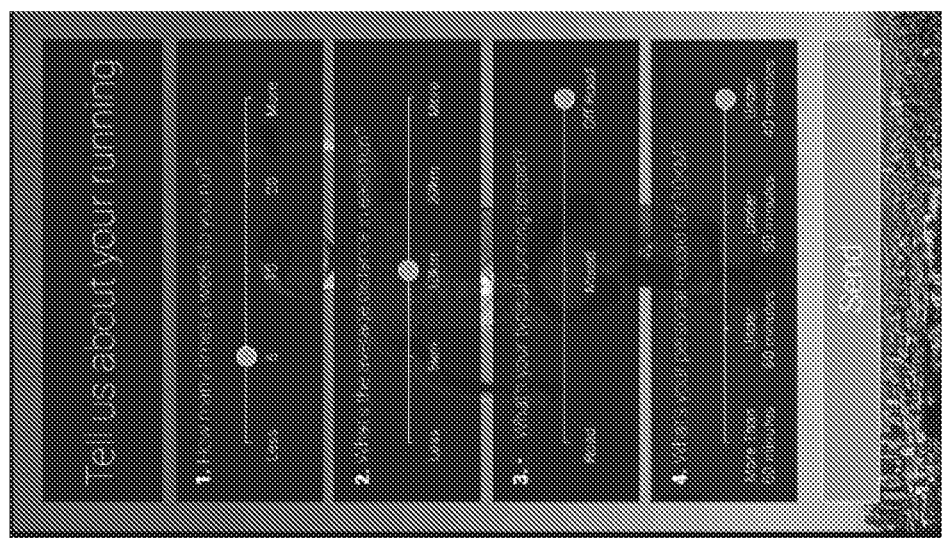

Reference is now made to FIGS. 12 A-12B, which are examples of screenshots showing interactive screens of the shopping assistant screen, for guiding a user to place their feet on the marked pad, according to some embodiments;

Reference is now made to FIGS. 13A-13B, which are examples of screenshots showing an interactive guide of the shopping assistant screen or mobile screen, for helping the user to define their profile, and their contact information, according to some embodiments;

Reference is now made to FIGS. 14A-14B, which are examples of screenshots of the shopping assistant screen or mobile screen, showing a simulated rendition of a pair of scanned feet and lower legs, according to some embodiments;

Reference is now made to FIGS. 15A-15B, which are examples of screenshots of the shopping assistant screen or mobile screen, for assisting a user in entering behavior related information, that may be used to provide better user related output.

Reference is now made to FIGS. 16A-16D, which show a set of perspective views of an example of a shopping assistant standing surface, according to some embodiments. As can be seen in the figures, standing surface 1600 is generally a flexible surface, such as a mat or carpet, optionally constructed from PVC, rubber, polyurethane, paper, cardboard, or any other suitable material. Standing surface 1600 typically includes a 3D part or element 1605 that replaces a wall, and enables correct positioning of feet for scanning. This 3D element functions as a foot barrier against which the back of the foot is placed. Standing surface 1600 typically includes markings 1610, dots or indicating graphics, to enhance accuracy of scanned images. In some embodiments, markings 1610 may function as markers, wherein there may be a variety of markers, and markers may have differing sizes, dimensions, functions etc. can be all the same or some may be different than others.

Figure 17:
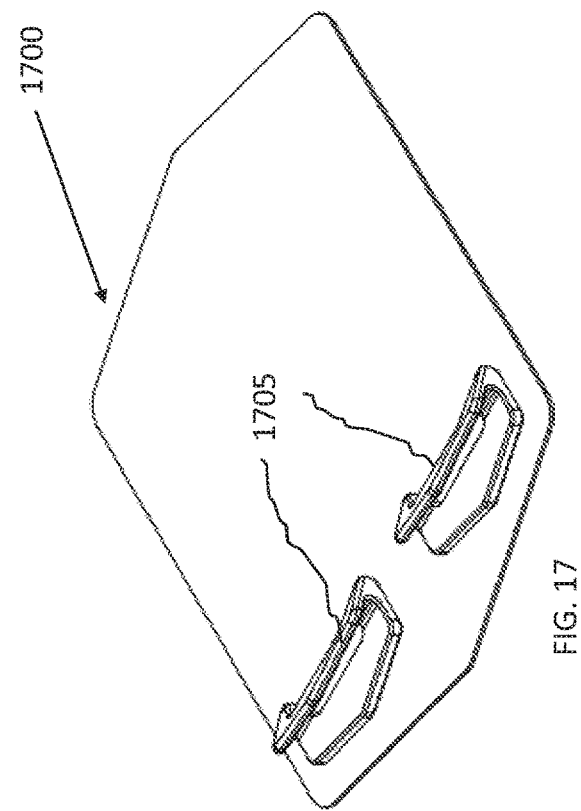
FIG. 17 shows an additional version of a shopping assistant standing surface, according to some embodiments.

FIG. 17 shows an additional version of a shopping assistant standing surface 1700, according to some embodiments. As can be seen, there is a 3D foot placement element 1705 for each foot.

Figure 18:
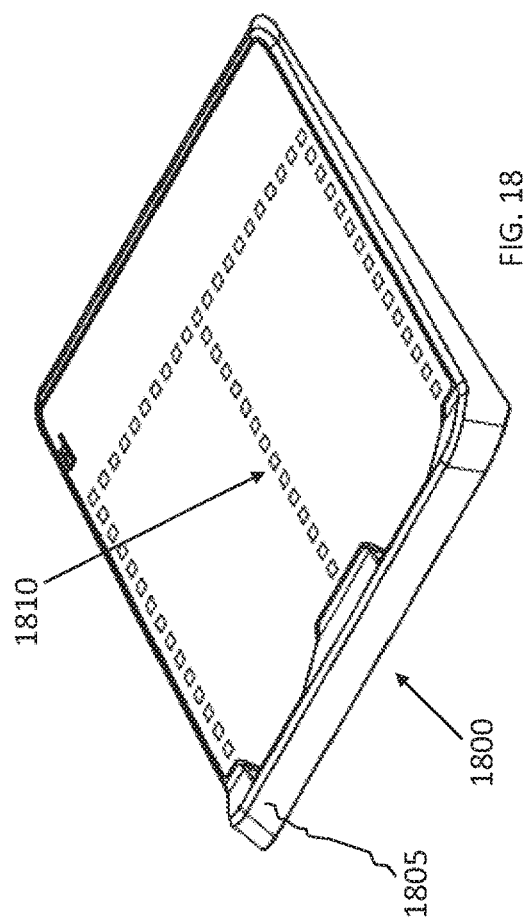
FIG. 18 shows a further version of a shopping assistant standing surface, according to some embodiments.

FIG. 18 shows a further version of a shopping assistant standing surface 1800, according to some embodiments. As can be seen, there is a differently shaped 3D foot placement element 1805.

Standing surface 1800 includes markings 1810.

Figure 19:
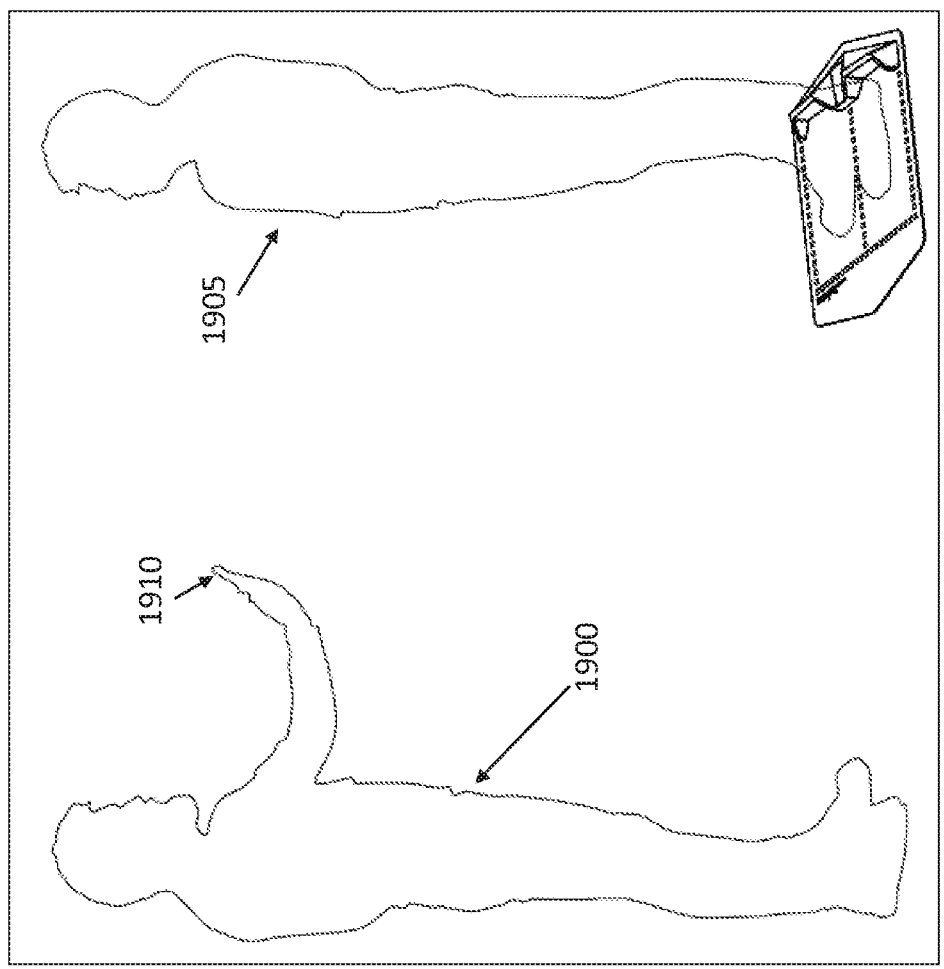
FIG. 19 shows a first user case in which a virtual graphic example is provided showing usage of the shopping assistant apparatus, according to some embodiments.

FIG. 19 shows a first user case in which a virtual graphic example is provided showing usage of the shopping assistant apparatus, according to some embodiments. As can be seen, the assistant 1900 may photograph or scan system user 1905, using a standard camera 1910 (e.g., phone or tablet) and/or a depth camera.

Figure 20:
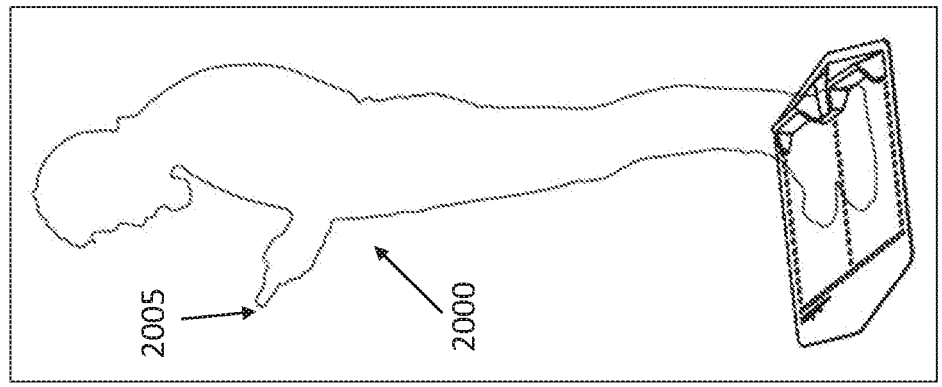
FIG. 20 shows a second user case in which a virtual graphic example is provided showing usage of the shopping assistant apparatus, according to some embodiments.

FIG. 20 shows a second user case in which a virtual graphic example is provided showing usage of the shopping assistant standing surface, according to some embodiments. As can be seen, the system user 2000 map perform a self-picture or scan, using a standard camera 2005 (e.g., phone or tablet) and/or a depth camera.

Figure 21:
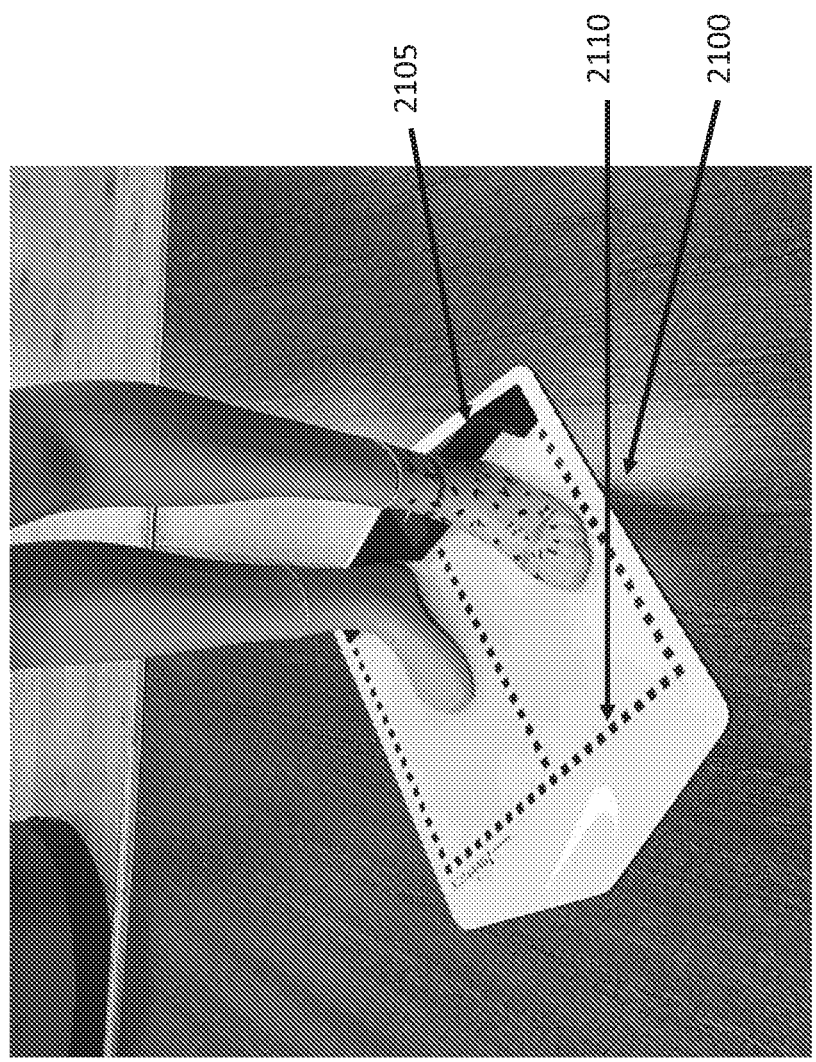
FIG. 21 is a picture showing an example of a user positioned on a shopping assistant apparatus, according to some embodiments.

FIG. 21 is a picture showing an example of a user positioned on a shopping assistant standing surface, according to some embodiments. As can be seen in the picture, standing surface 2100 typically includes a 3D part or element 2105 that replaces a wall, and enables correct positioning of feet for scanning. This 3D element functions as a foot barrier against which the back of the foot is placed. Standing surface 2100 typically includes markings or indicating graphics 2110.

In accordance with some embodiments, a virtual scan mat may be used, to enable a user device to generate an accurate scan of their body, for example the user's feet, without a physical mat or marked surface, as described above. In some embodiments a reference object, such as a rectangular piece or paper or card, is required to enable the shopping assistant application, device and/or system to accurately map and scan the user's body. In many embodiments, no reference object is required.

In some embodiments, the user device, application software and/or server may integrate augmented reality (AR) functionality to assist users in making accurate scans, without usage of a physical scanning mat. For example, known AR kits, such as Apple's AR kit or Google's AR core may be used to provide AR functionality in the shopping assistant applications. Accordingly, the AR may be used to provide virtual assistance to the user and/or to provide a virtual mat or surface for the user, with lines and markings etc. as may be needed, to guide the user to stand appropriately to enable an accurate scan to be performed. In some embodiments, a virtual assistant, such as a character or avatar, may be used, or selectively used to guide the user. In some embodiments the virtual assistant can guide and correct the user in real time, for example, to tell the user to position themselves differently, change the light etc., to enhance the scan.

In many embodiments, the virtual scan map generated by the user device/application may appear transparent to the user, thereby enabling the user to stand substantially anywhere, while the system imposes the virtual scan map over the user's feet, and captures the relevant scan data, together with the virtual mat markings, whether seen or transparent markings, to generate a shopping profile and/or avatar.

In some embodiments, an angle measurement means may be provided to enable angle control, to enable the user to scan at various supported angles, and still generate an accurate scan. For example, an angle measurement graphic showing a status of device accelerometer and/or gyro meter status may be used to show the user if the current angle of scanning is acceptable, and if not, to assist the user to scan at a more appropriate angle.

In several embodiments, a focus enhancement means may be provided to enable the user to generate an accurate scan and in parallel be able to view the object scanned in focus. For example, one or more captures may be taken of the feet and/or environment in AR mode, and one or more captures may be taken of the feet and/or environment in picture (focus) mode, such that when viewing the AR environment, a focused image of the feet can be imposed in the AR view, to make sure a focused image of the feet is constantly displayed.

In many embodiments, a virtual try on means may be provided to enable the user to generate an accurate profile or avatar of a scanned body part, such as feet, and to place on the feet a virtual shoe, using AR. In this way, different types, sizes, kinds, brands, colors, patterns etc. may be seen on the user's feet, using AR to render selected footwear on the user's feet. In some embodiments, other body parts may be scanned, to generate a profile of the selected parts, as described herein regarding feet.

In many embodiments, different processing algorithms may be used to achieve optimum profile generation and/or display for different feet. Accordingly, a scan may be processed by multiple algorithms and the best one may be selected to be used for the user profile. In some embodiments a machine learning means may be used to conduct automated voting on the optimal profile to be used.

FIGS. 22A-22J are examples of screenshots and tutorial screens showing a series of steps to guide the user to use a virtual scan mat, according to some embodiments. As can be seen in the figures, steps are taken by the system, apparatus, device and Application to provide the user with a virtual standing surface, generated using augmented reality. The virtual standing surface typically includes virtual markings, such as dots, lines and indicating graphics, to enhance accuracy of scanned images, and ease of use for the user.

Figure 22B:
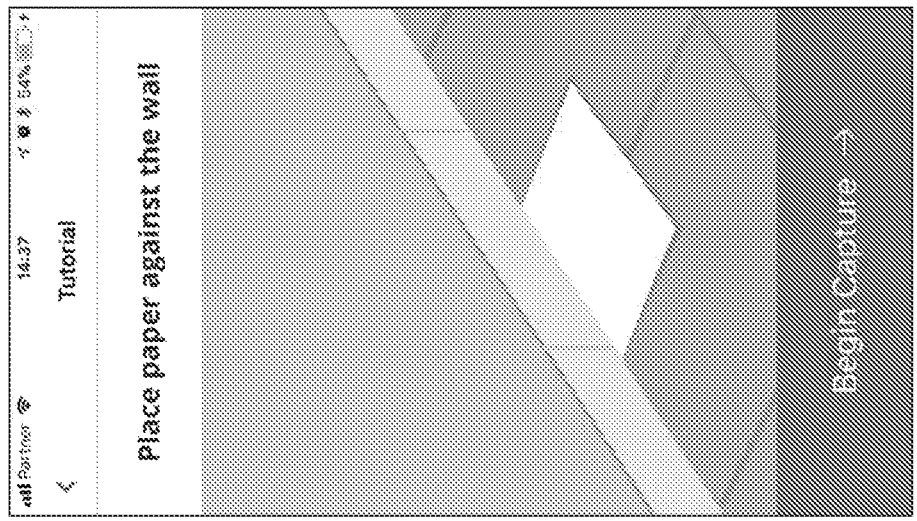
FIGS. 22A-22J are examples of screenshots and tutorial screens showing a series of steps to guide the user to use a virtual scan mat, according to some embodiments.
Figure 22A:
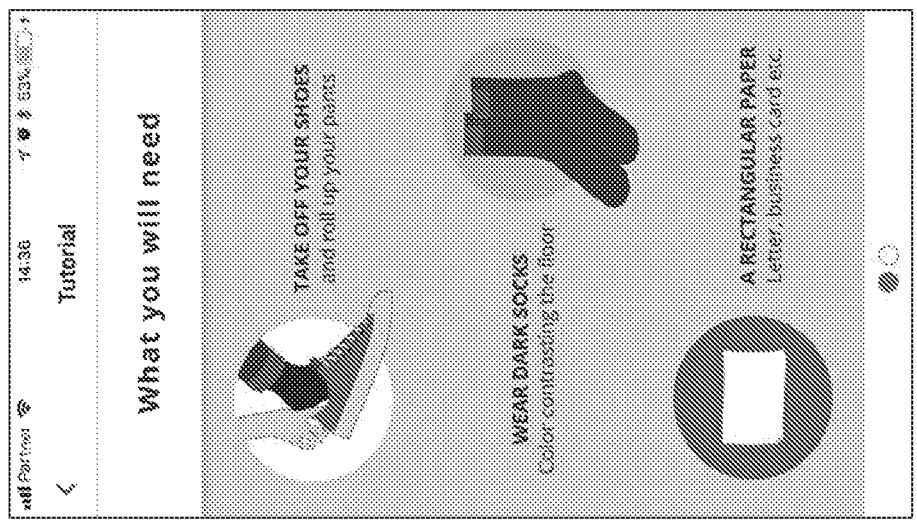

FIG. 22A is a screenshot showing an example of a GUI of the shopping assistant screen, for guiding a user as to how to prepare for usage of a virtual shopping assistant, according to some embodiments. As can be seen, the user may be asked, for example, to take off shoes, wear appropriate socks, and prepare a suitable reference object, such as a rectangular card or paper.

FIG. 22B is a screenshot showing an example of a GUI of the shopping assistant screen, for guiding a user as to how to prepare the selected reference object for scanning, prior to usage of a virtual shopping assistant, according to some embodiments.

Figure 22D:
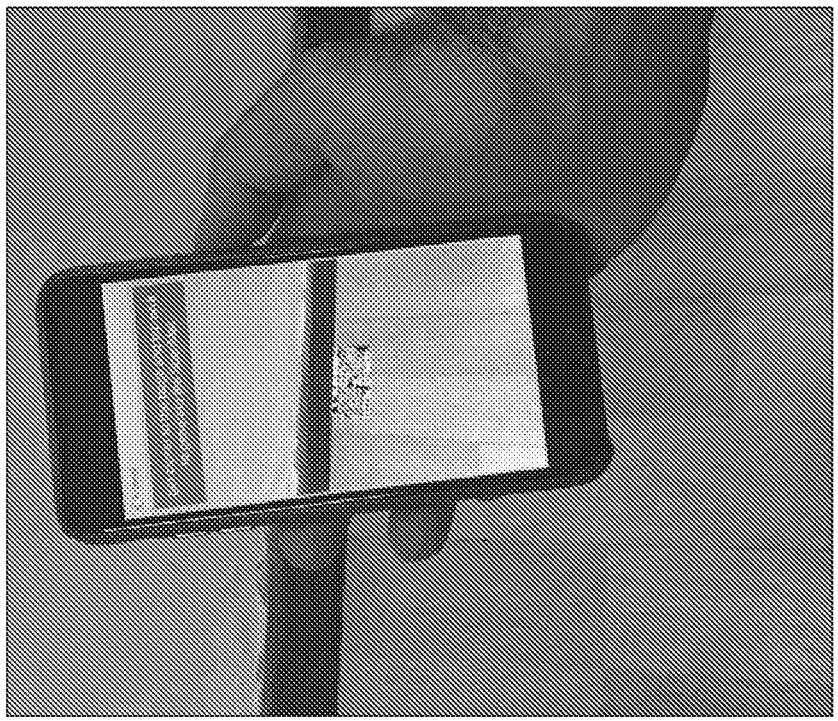
Figure 22C:
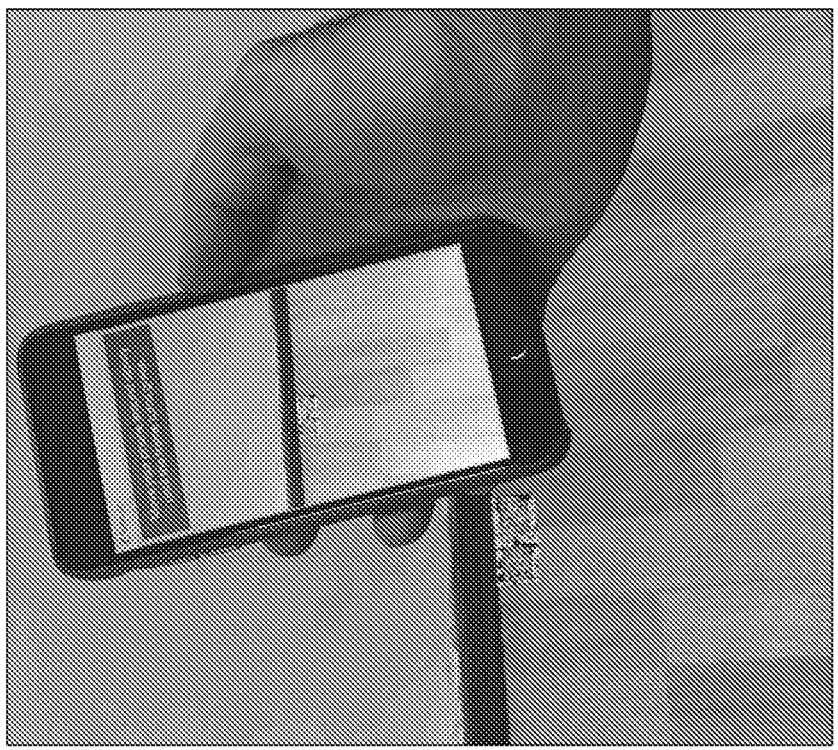

FIG. 22C is a capture showing an example of a user holding a smart phone that is displaying a GUI of the shopping assistant screen, for guiding a user to calibrate the user device with the environment to be used for the virtual assistant, according to some embodiments. As can be seen in the example provided, the user may be requested to move their phone or device around slowly until an indication, such as screen or frame color change, is provided indicating that the device has mapped or otherwise successfully scanned the environment, For example, this initial scan may picture the reference object and other details of the environment, and then this data may be processed to determine the size of the reference object, and necessary environment elements, to enable an accurate measurement of a user's body, in the next steps.

Figure 22F:
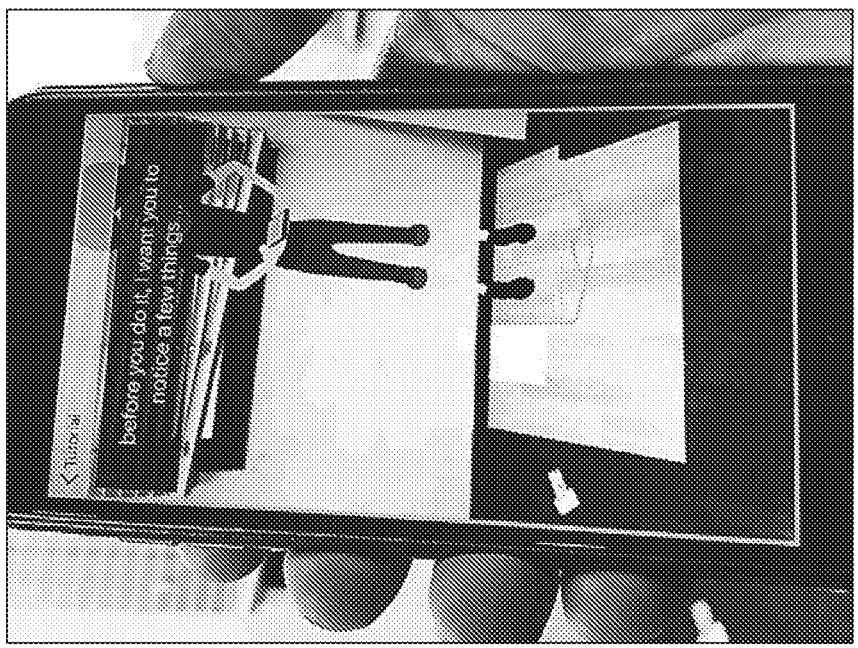
Figure 22E:
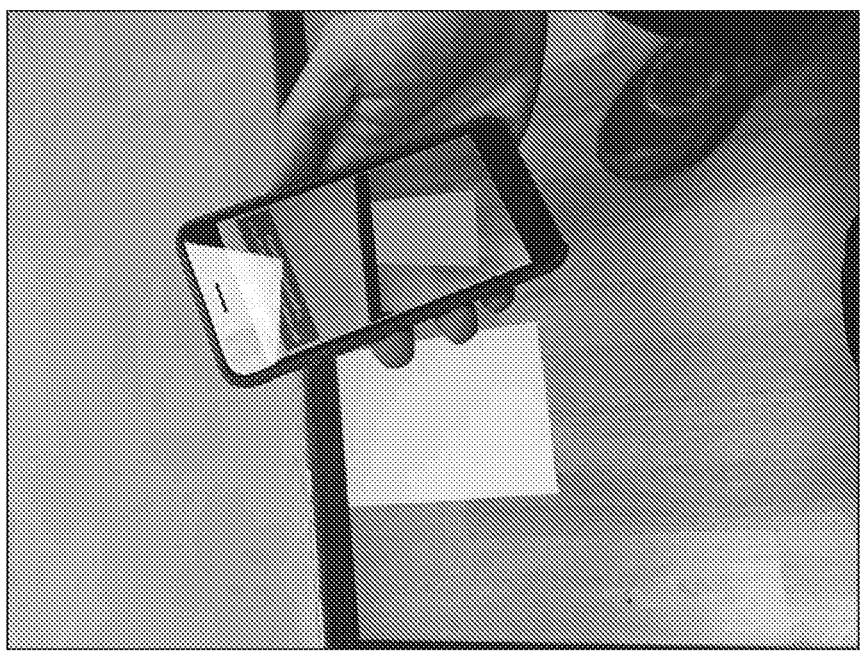

FIGS. 22D and 22E are captures showing examples of a user holding a smart phone that is displaying a GUI of the shopping assistant screen, for guiding a user to scan the environment to be used for the virtual assistant, according to some embodiments. As can be seen in the examples provided, the user may be requested to move their phone or device closer to the page or reference object, and to tap on the digital image of the reference object, in order to tell the Application to generate a virtual scan mat.

Figure 22H:
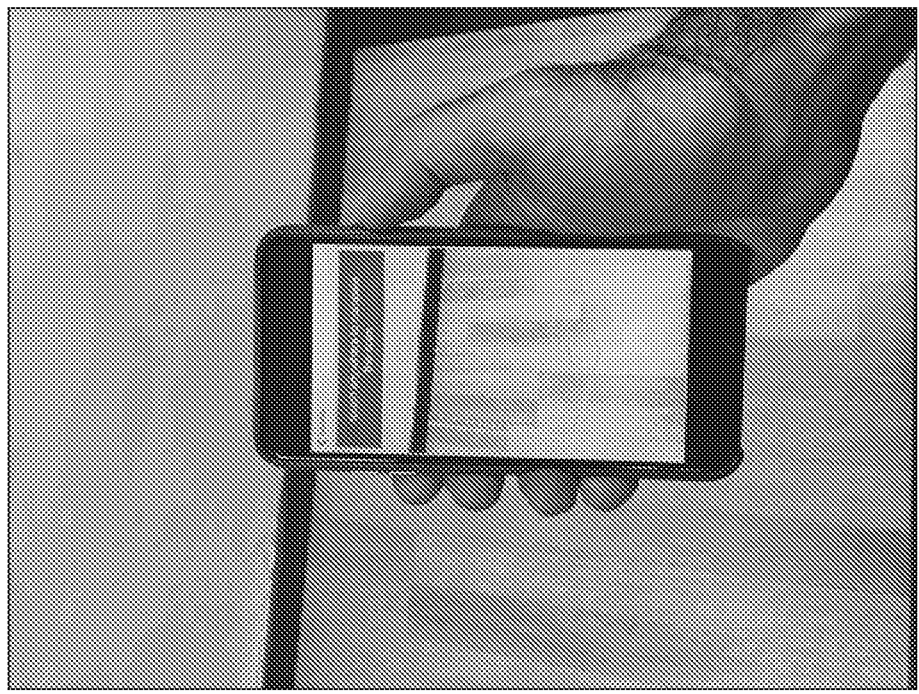
Figure 22G:
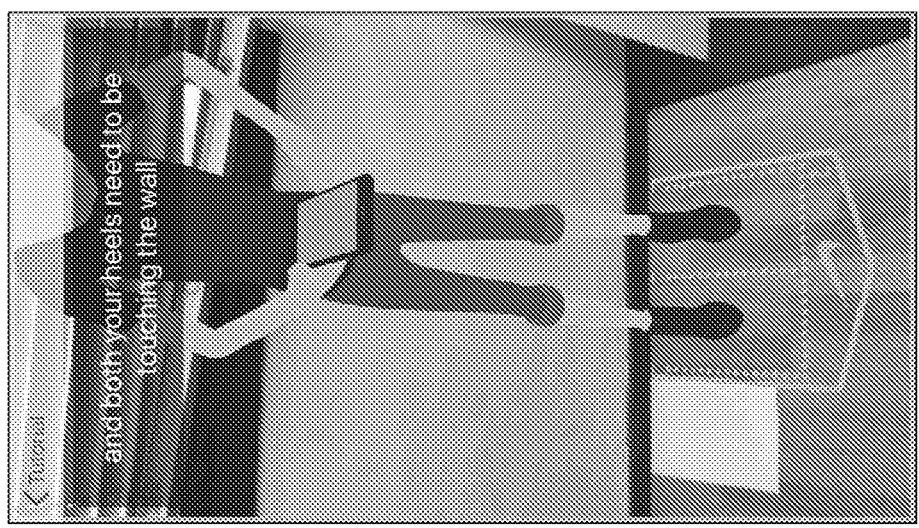

FIGS. 22F and 22G are captures showing examples of a user holding a smart phone that is displaying a GUI integrating augmented reality functionality to further guide the user. As can be seen, a virtual rendition of the user may provide further instructions or guidelines to the user, with appropriate graphics to assist the user.

FIG. 22H is a capture showing an example of a user holding a smart phone that is displaying a GUI of the shopping assistant screen, for guiding a user to select a place to complete the scan procedure and generate a virtual scan mat in the selected place.

Figure 22J:
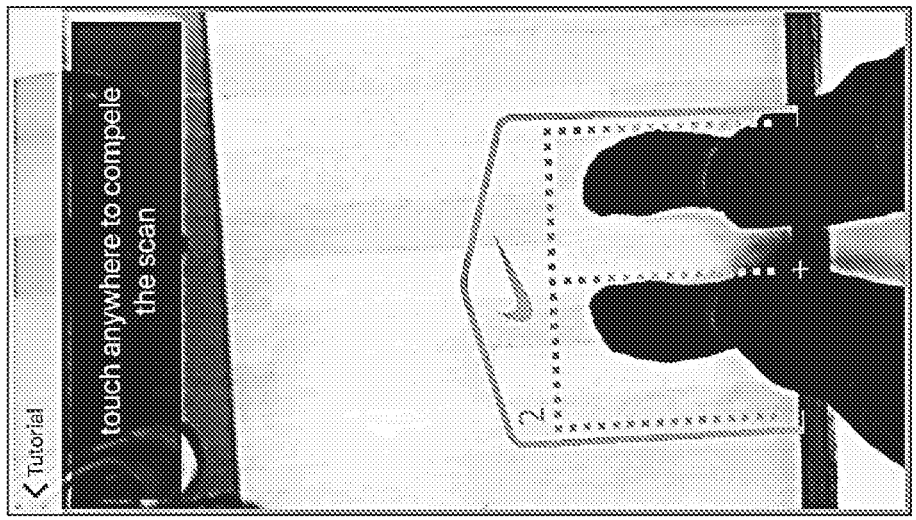
Figure 22I:

FIG. 22I is a capture showing an example of a user holding a smart phone that is displaying a GUI of the shopping assistant screen, for guiding a user to select a place to complete the scan procedure and generate a virtual scan mat in the selected place.

FIG. 22J is a screenshot showing an example of a GUI of the shopping assistant screen, showing a virtual scan mat in a selected place, for the user to stand on or "inside" the virtual scan mat, for scanning of the user's body, or feet in this case. The user device can now scan the user's feet, and process the scanned data to render an accurate profile of the user's feet, based on the usage of the virtual scan mat.

Figure 23:
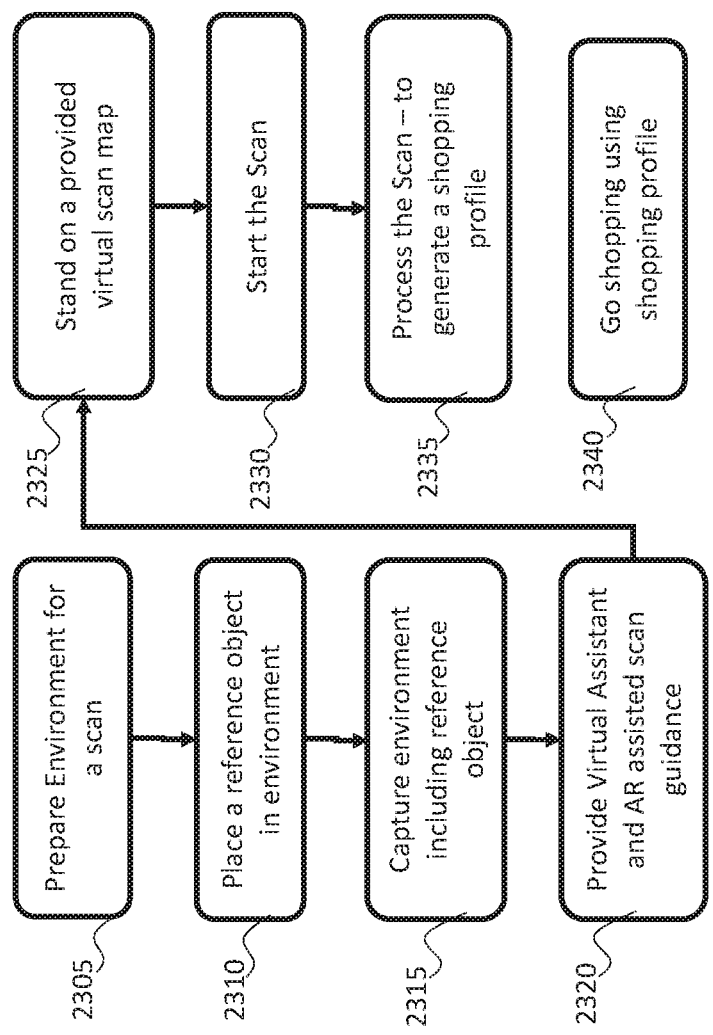
FIG. 23 is a flow chart describing a flow of steps in a process of virtual shopping profile generation and usage, according to some embodiments.

FIG. 23 is a flow chart describing a flow of steps in a process of virtual shopping profile generation usage, according to some embodiments. As can be see, at step 2305, a remote user with a computing device running a virtual shopping assistant application is instructed to prepare the environment for a profile generating scan, for example, for a feet scan, the user may be required to remove shoes, wear appropriate clothing and prepare a suitable reference object. At step 2310 the user is instructed to place the reference object in an appropriate location, for example against the wall in a room. At step 2315 the user is instructed to capture the environment with their device camera, including capture of the reference object, and to tap on the reference object captured to define it as the reference object. At step 2320 a virtual assistant, optionally including a virtual image of the user, may further assist or guide the user to execute the scan appropriately, using an AR rendition of the user figuring on the virtual scanning surface or map. At step 2325 the user is instructed to stand in the digitally super-imposed virtual scan mat. At step 2330 the user is instructed to start the scan, by tapping a "scan" button or function. At step 2335 the scan may be processed, to form a user profile to be used in remote shopping. At step 2340 the user shops in a real or digital store, using the shopping profile.

In some embodiments, the shopping assistant standing surface may include active components such as light, detector, sound etc. In such cases the shopping assistant standing surface may include a power source, optionally battery powered, and one or more suitable sensors.

In some embodiments, the shopping assistant standing surface may include a pressure plate (optionally Bluetooth enabled) to assist in receiving additional data on the shape of the user's arches.

In some embodiments, the shopping assistant standing surface may be foldable, for example for storage, transportation or display reasons.

In a further configuration, the shopping assistant standing surface may be integrated onto a "fitting chair".

In some embodiments, the shopping assistant standing surface may include two standing sides with two different colors (e.g., for image recognition).

In some embodiments, the shopping assistant standing surface may be placed on, fitted onto or integrated with a fitting chair or stool. In such cases the standing surface may be placed to receive a users' feet when in sitting pose.

In some embodiments, the shopping assistant standing surface may include an augmented reality (AR) functionality, thereby allowing the user standing on the standing surface to browse through shoes on his or her feet and see them on the generated model. For example, this may enable the customer looks at his/her bare feet or feet with socks, and see through AR glasses or a phone/tablet different shoes that s/he can browse from in augmented reality tracking based on her/his feet.

In some embodiments, the shopping assistant apparatus may help a chain store generate loyalty online and/or offline, by allowing automated shopping assistance in multiple stores, proactive up sales and cross sales, etc.

In several embodiments, the user shopping experience for footwear may be substantially enhanced, by applying the following steps: Measuring on apparatus 185 a user physical profile, and providing a user standard size as well as modifications for different shoes/brands; Getting an ID or shopping profile of the customer to the customer's mobile computing or communications device; and getting an ID or shopping profile of the customer from apparatus 185 to a communications cloud.

In a first user case, where a user has no previous user profile, the shopping assistance process may be implemented as follows: The user generally removes shoes and stands on the Launch pad or shopping assistant apparatus at entrance to a store or shopping areas. In the current example, a footwear application is described. The apparatus subsequently measures/scans the users body area, such as feet, and thereafter the apparatus, or cloud network, may process the user data and generate a user shopping avatar. Once generated the avatar is sent to the user's mobile device, running the shopping assistant Application, for example using mail, beacon, SMS, QR code, IR beam etc. The user may then scan wanted shoes, whereby the apparatus is configured to match and then try on shoes wanted to an avatar to provide best fit. The apparatus may also provide to the user related product information, such as availability, colors, sizes, related shoes, rankings etc.

In a second user case, where a user has multiple devices, the shopping assistance process may be implemented as follows: The user generally removes shoes and stands on the Launch pad or shopping assistant apparatus at entrance to a store or shopping areas. In the current example, a footwear application is described. The apparatus subsequently measures/scans the users body area, such as feet, and thereafter the apparatus, or cloud network, may process the user data and generate a user shopping avatar. Once generated the avatar is sent to the user's mobile device, running the shopping assistant Application, for example using mail, beacon, SMS, QR code, IR beam etc. The user may then scan wanted shoes, whereby the apparatus is configured to match and then try on shoes wanted to an avatar to provide best fit. The apparatus may provide to the user expert or consulting information, thereby functioning at least in part as a sales representative. The apparatus may also provide related product information, such as availability, colors, sizes, related shoes, and rankings, as well as an Option to measure movement/style/weight etc.

In a third user case, an augmented shopping experience may be delivered, whereby the automated shopping assistance process may incorporate a local shoe scan. In some cases, user data or avatar's may be used to filter in appropriate reviews/comments from online world+social feedback+rankings, sales information/history, recommendations, up sales, cross sales etc.

The foregoing description of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A shopping assistant system, comprising: a processor; and a memory in communication with the processor and storing instructions that, when read by the processor, cause the shopping assistant system to:
   display, on a user device, a guide interface to guide a user to calibrate the user device with a background environment, wherein calibrating the user device includes instructing a movement of the user device at a specified rate until determining a successful scan has been completed, and displaying of a first indication on the guide interface indicating that the user device has successfully scanned the background environment;
   upon calibrating the user device with the background environment, provide, to the user device, a second indication that the user device has been calibrated;
   in response to a user input identifying a user-selected location, present a selectable interface element to generate a virtual scan mat;
   upon receiving a user interaction with the selectable interface element, generate, using the user device, the virtual scan mat at the user-selected location by performing a scan procedure of a selected area with the user device, wherein the virtual scan mat includes an augmented reality rendition of markings in the user-selected location that are configured to guide an image scan;
   display, using the user device, a display screen comprising the virtual scan mat at the user-selected location and an avatar, the virtual scan mat comprising digitally superimposed markings at the user-selected location to guide the user to stand appropriately to accurately scan a part of the user's body without reference to a physical mat or marked surface, and the avatar configured to provide instructions to capture an image of the part of the user's body;
   obtain, from the user device, a single image of the part of the user's body when the part of the user's body is within the markings of the virtual scan mat;
   calculate, based on the single image, user body measurement data of the part of the user's body;
   process the user body measurement data to remove data associated with the background environment from the user body measurement data;
   generate, based on the processed user body measurement data, a 3D model of the part of the user's body, wherein the 3D model comprises the user body measurement data;
   generate, based on at least the user body measurement data, at least one product recommendation; and display the at least one product recommendation.

2. The shopping assistant system of claim 1, wherein the user body measurement data comprises a length, a breadth, and a depth of the part of the user's body.

3. The shopping assistant system of claim 1, wherein the virtual scan mat comprises one or more augmented reality generated markings aligned in accordance with the scan procedure and configured to align the part of the user's body in the user-selected location.

4. The shopping assistant system of claim 1, wherein processing the user body measurement data to remove data associated with the background environment from the user body measurement data includes processing the user body measurement data to remove a floor from the user body measurement data.

5. The shopping assistant system of claim 1, wherein the at least one product recommendation comprises at least one product tag associated with a product.

6. The shopping assistant system of claim 1, wherein the instructions, when read by the processor, further cause the shopping assistant system to transmit the at least one product recommendation to a mobile device associated with a second user based on receiving authorization from the user, wherein the mobile device allows the second user to shop for the user, and wherein the at least one product recommendation is displayed on the generated 3D model of the part of the user's body and is provided for display on the mobile device associated with the second user.

7. The shopping assistant system of claim 1, wherein the at least one product recommendation is generated based on a combination of user shopping history data, user preference data, and at least one measurement of the part of the user's body to corresponding product data.

8. The shopping assistant system of claim 1, wherein the instructions, when read by the processor, further cause the shopping assistant system to transmit the at least one product recommendation to a social media platform for viewing by one or more third parties.

9. The shopping assistant system of claim 1, wherein the part of the user's body comprises the user's feet.

10. The shopping assistant system of claim 1, wherein:
the shopping assistant system comprises at least one camera; and
the at least one camera captures at least one image of the part of the user's body when the user's body part is within the markings of the virtual scan mat.

11. The shopping assistant system of claim 1, wherein the single image is obtained only upon displaying a message for the user to initiate obtaining the single image and upon receiving a user selection of the message.

12. The shopping assistant system of claim 1, wherein the instructions, when read by the processor, further cause the shopping assistant system to:
obtain scanned product data, wherein the scanned product data is obtained based on a tag associated with a product;
determine a recommended size for the product based on the user body measurement data; and
display the recommended size for the product.

13. The shopping assistant system of claim 12, further comprising:
generating a second 3D model of the product based on the recommended size for the product; and
displaying the second 3D model.

14. The shopping assistant system of claim 1, wherein calibrating the user device with the background environment comprises:
scanning, by the user device, the background environment;
determining, by the user device, a target location for the virtual scan mat based on the scanned background environment;
providing a display on the user device indicating instructions to guide the user to position the user device to generate the virtual scan mat within the target location; and
provide a notification on the user device that the target location is appropriate for the virtual scan mat.

15. A method, comprising:
displaying, on a shopping assistant device, a guide interface to guide a user to calibrate the shopping assistant device with a background environment, wherein calibrating the shopping assistant device includes instructing a movement of the shopping assistant device at a specified rate until determining a successful scan has been completed, and displaying a first indication on the guide interface indicating that the shopping assistant device has successfully scanned the background environment;
upon calibrating the shopping assistant device with the background environment, providing, to the shopping assistant device, a second indication that the shopping assistant device has been calibrated;
in response to user input identifying a user-selected location, presenting a selectable interface element to generate a virtual scan mat;
upon receiving a user interaction with the selectable interface element, generating, by the shopping assistant device, the virtual scan mat by performing a scan procedure of the user-selected location with the shopping assistant device, wherein the virtual scan mat includes an augmented reality rendition of markings in the user-selected location that are configured to guide an image scan;
displaying, by the shopping assistant device, a display screen comprising the virtual scan mat and an avatar, the virtual scan mat comprising digitally super-imposed markings in the user-selected location to guide the user to stand appropriately to accurately scan a part of the user's body without reference to a physical mat or marked surface, and the avatar configured to provide instructions to capture an image of the part of the user's body;
obtaining, by the shopping assistant device, a single image of the part of the user's body when the part of the user's body is within the markings of the virtual scan mat;
calculating, by the shopping assistance device and based on the single image, user body measurement data of the part of the user's body;
processing the user body measurement data to remove data associated with the background environment from the user body measurement data;
generating, by the shopping assistant device and based on the processed user body measurement data, a 3D model of the part of the user's body, wherein the 3D model comprises the user body measurement data;
generating, by the shopping assistant device and based on at least the user body measurement data, at least one product recommendation; and
displaying, by the shopping assistant device, the at least one product recommendation.

16. The method of claim 15, wherein the part of the user's body comprises the user's feet.

17. The method of claim 15, wherein the user body measurement data comprises a length, a breadth, and a depth of the part of the user's body.

18. The method of claim 15, wherein the at least one product recommendation is fitted on the 3D model of the part of the user's body.

19. The method of claim 15, wherein the at least one product recommendation is generated based on a combination of user shopping history data, user preference data, and at least one measurement of the part of the user's body to corresponding product data.

20. The method of claim 15, wherein the at least one product recommendation is a personalized product based on a combination of the 3D model of the part of the user's body and a user preference.

21. The method of claim 15, further comprising:
obtaining at least one additional image of the part of the user's body; and
refining the 3D model based on the at least one additional image.

* * * * *

UNITED STATES PATENT AND TRADEMARK OFFICE
CERTIFICATE OF CORRECTION

| | |
|---|---|
| PATENT NO. | : 12,211,076 B2 |
| APPLICATION NO. | : 16/256472 |
| DATED | : January 28, 2025 |
| INVENTOR(S) | : David Alexander Bleicher et al. |

It is certified that error appears in the above-identified patent and that said Letters Patent is hereby corrected as shown below:

In the Claims

Column 27, Claim 1, Line 61:
After "comprising:", insert --¶--
Column 27, Claim 1, Line 62:
After "and", insert --¶--
Column 28, Claim 1, Line 42:
After "and", insert --¶--

Signed and Sealed this
Fourth Day of November, 2025

John A. Squires
*Director of the United States Patent and Trademark Office*